(12) United States Patent
Webb et al.

(10) Patent No.: US 10,798,711 B2
(45) Date of Patent: *Oct. 6, 2020

(54) MOBILE COMMUNICATION EQUIPMENT AND METHOD FOR ALLOCATING SYSTEM INFORMATION AMONG VIRTUAL CARRIERS FOR MACHINE-TYPE COMMUNICATIONS

(71) Applicant: SONY CORPORATION, Tokyo (JP)

(72) Inventors: Matthew Webb, London (GB);
Dimitris Koulakiotis, Limmassol (CY);
Hideji Wakabayashi, Berkshire (GB);
Yuichi Morioka, Berkshire (GB);
Stephen Truelove, Cumbria (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/966,968

(22) Filed: Apr. 30, 2018

(65) Prior Publication Data

US 2018/0255541 A1    Sep. 6, 2018

Related U.S. Application Data

(63) Continuation of application No. 14/650,927, filed as application No. PCT/GB2014/050135 on Jan. 17, 2014, now Pat. No. 9,986,568.

(30) Foreign Application Priority Data

Jan. 24, 2013    (GB) .................................. 1301296.8

(51) Int. Cl.
*H04W 72/04*    (2009.01)
*H04L 1/00*    (2006.01)
(Continued)

(52) U.S. Cl.
CPC ....... *H04W 72/048* (2013.01); *H04W 72/042* (2013.01); *H04L 1/0046* (2013.01);
(Continued)

(58) Field of Classification Search
None
See application file for complete search history.

(56) References Cited

U.S. PATENT DOCUMENTS 9,986,568 B2 * 5/2018 Webb .................. H04W 72/042
2009/0239554 A1 * 9/2009 Sammour ............. H04W 84/12
455/458

(Continued)

FOREIGN PATENT DOCUMENTS

GB    2487906 A    8/2012
GB    2491858 A    12/2012
(Continued)

OTHER PUBLICATIONS

European Office Action issued in European Patent Application No. 14 700 784.3 dated May 22, 2018.
(Continued)

*Primary Examiner* — Jay L Vogel
(74) *Attorney, Agent, or Firm* — Xsensus LLP

(57) ABSTRACT

A mobile communications network includes one or more network elements providing a wireless access interface for communications devices. The wireless access interface provides plural communications resource elements across a host frequency range of a host carrier. First and second sections of communications resources within respective first and second frequency ranges for preferable allocation to reduced capability devices form respective first and second virtual carriers. Each of the first and second frequency ranges is within the host frequency range, wherein the communications device is configured with a reduced capability to
(Continued)

receive the signals only within a frequency bandwidth less than the host frequency range and equal to at least one of the first or second frequency range. The communications device is configured to receive the first signalling data from the control channel and the common system information from the one or more communications resources identified by the first signalling data.

17 Claims, 13 Drawing Sheets

(51) Int. Cl.
*H04L 5/00* (2006.01)
*H04W 4/70* (2018.01)

(52) U.S. Cl.
CPC .......... *H04L 1/0072* (2013.01); *H04L 5/0053* (2013.01); *H04L 5/0064* (2013.01); *H04W 72/0446* (2013.01); *H04W 72/0453* (2013.01)

(56) References Cited

U.S. PATENT DOCUMENTS

| | | | | |
|---|---|---|---|---|
| 2010/0080308 | A1* | 4/2010 | Yin | H04L 5/0007 375/260 |
| 2011/0059718 | A1* | 3/2011 | Wang | H04W 4/90 455/404.1 |
| 2011/0138430 | A1 | 6/2011 | Basso | |
| 2011/0270984 | A1 | 11/2011 | Park | |
| 2012/0063358 | A1 | 3/2012 | Etemad | |
| 2012/0082130 | A1* | 4/2012 | Xue | H04L 5/001 370/330 |
| 2013/0107721 | A1 | 5/2013 | Wang | |
| 2013/0272215 | A1* | 10/2013 | Khoryaev | H04W 28/0226 370/329 |
| 2013/0322320 | A1 | 12/2013 | Lee et al. | |
| 2014/0036820 | A1* | 2/2014 | McNamara | H04L 5/0007 370/329 |
| 2014/0044027 | A1* | 2/2014 | Beale | H04W 56/00 370/311 |
| 2014/0119315 | A1* | 5/2014 | Darwood | H04W 72/042 370/329 |
| 2015/0327239 | A1 | 11/2015 | Webb | |

FOREIGN PATENT DOCUMENTS

| | | |
|---|---|---|
| GB | 2491859 A | 12/2012 |
| GB | 2508595 A | 6/2014 |
| WO | WO 2012/104629 A2 | 8/2012 |
| WO | WO 2012/104634 A1 | 8/2012 |
| WO | WO 2012/104635 A1 | 8/2012 |
| WO | WO 2012/104644 A1 | 8/2012 |
| WO | WO 2012/109439 A1 | 8/2012 |
| WO | WO 2012/115377 A2 | 8/2012 |
| WO | WO 2012/172323 A1 | 12/2012 |
| WO | WO 2012/172324 A1 | 12/2012 |

OTHER PUBLICATIONS

United Kingdom Search Report dated Jul. 30, 2013 in Patent Application No. GB1301296.8.
International Search Report dated Apr. 3, 2014 in PCT/GB2014/050135.
Office Action dated Aug. 22, 2017 in Japanese Patent Application No. 2015-554239 (with English summary).
IPWireress Inc., "A review of ePDCCH support for MTC operation", 3GPP TSG RAN WG1 Meeting #68bis, Jeju Island; South Korea, Mar. 26-30, 2012, R1-120960, 5 Pages.
Alcatel-Lucent, Alcatel-Lucent Shanghai Bell, "Group Triggering and Messaging Considerations", SA WG2 Meeting #93, Oct. 8-12—Sofiai Bulgaria, S2-123707, 3GPP, 2012, 4 Pages.
Chinese Office Action issued in Chinese Patent Application No. 20148006090.3 dated Feb. 2, 2018 (w/ English translation).

* cited by examiner

Common and VC-specific SI messages located from VC PDCCHs.
Common SI messages are in VC resources. HC SI is unaffected and not shown VCs with common SI are closely spaced in frequency to allow UEs to have reduced bandwidth Common and VC-specific SI messages from VC PDCCHs.
Common SI messages are in HC resources. HC SI is unaffected and not shown VC-common SI messages in aggregated resources from VCs.

VC-common SI messages in aggregated resources from VCs in differing OFDM symbols.

A third or further VC obtains VC-common SI from resources aggregated in other VC's resources. This could be regarded as a combination of the first and third embodiments of the invention

MOBILE COMMUNICATION EQUIPMENT AND METHOD FOR ALLOCATING SYSTEM INFORMATION AMONG VIRTUAL CARRIERS FOR MACHINE-TYPE COMMUNICATIONS

CROSS-REFERENCE TO RELATED APPLICATIONS

The present application is a continuation of and claims the benefit of priority under 35 U.S.C. § 120 from U.S. application Ser. No. 14/650,927, filed Jun. 10, 2015, which is based on PCT application PCT/GB2014/050135 filed Jan. 17, 2014, and claims priority to British Patent Application 1301296.8, filed in the UK IPO on Jan. 24, 2013, the entire contents of each of which is being incorporated herein by reference.

TECHNICAL FIELD OF THE DISCLOSURE

The present disclosure relates to infrastructure equipment for mobile communications networks, mobile communications networks and systems and methods of communicating using mobile communications networks.

BACKGROUND OF THE DISCLOSURE

Mobile communications systems continue to be developed to provide wireless communications services to a greater variety of electronic devices. In more recent years, third and fourth generation mobile telecommunication systems, such as those based on the 3GPP defined UMTS and Long Term Evolution (LTE) architectures have been developed to support more sophisticated communications services to personal computing and communications devices than simple voice and messaging services offered by previous generations of mobile telecommunication systems. For example, with the improved radio interface and enhanced data rates provided by LTE systems, a user may enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

More recently it has been recognised that rather than providing high data rate communications services to certain types of electronics devices, it is also desirable to provide communications services to electronics devices that are simpler and less sophisticated. For example, so-called machine type communication (MTC) applications may be semi-autonomous or autonomous wireless communication devices which may communicate small amounts of data on a relatively infrequent basis. Some examples include so-called smart meters which, for example, are located in a customer's house and periodically transmit information back to a central MTC server data relating to the customer's consumption of a utility such as gas, water, electricity and so on.

In some mobile communications networks a plurality of separate carriers of a wireless access interface are aggregated together. In US 2012/0063358 [1] there is disclosed an arrangement for aggregating carriers in which a base station of a mobile communications network is configured to broadcast a configuration message containing component carrier configuration information that is common to a plurality of communications devices.

Providing an arrangement of a mobile communications network, which makes a more efficient use of available communications resources is generally a technical aim for improving mobile communications systems.

SUMMARY OF THE DISCLOSURE

Embodiments of the present disclosure can provide in one example a communication device for transmitting data to and receiving data from a mobile communications network. The mobile communications network includes one or more network elements (infrastructure equipment), the one or more network elements providing a wireless access interface for the communications device. The communications device comprises a transmitter unit adapted to transmit signals representing the data to the mobile communications network, via the wireless access interface provided by the one or more network elements of the mobile communications network, and a receiver unit adapted to receive signals representing the data from the mobile communications network via the wireless access interface provided by the one or more network elements of the mobile communications network. The wireless access interface provides a plurality of communications resource elements across a host frequency range of a host carrier, a first section of the communications resources within a first frequency range for preferable allocation to reduced capability devices forming a first virtual carrier and a second section of the communications resources within a second frequency range for preferable allocation to the reduced capability devices forming a second virtual carrier. Each of the first frequency range and the second frequency range is within the host frequency range, so that the first and the second virtual carriers are provided within the host carrier. The mobile communications network preferably allocates the communications resources to the reduced capability devices in the sense that the reduced capability devices are given priority to the communications resources of the first or the second sections of communications resources over the allocation of the communications resources to communications devices which are able to communicate using a bandwidth which is greater than the first or the second sections of communications resources. In one example, the first and second sections of the communications forming, the first and second virtual carriers are reserved for allocation to the reduced capability devices only, but in other examples, some of the communications resources of the first and second sections of the first and second virtual carriers may be allocated to the full capability communications devices, if a demand for the communications resources from the reduced capability devices leaves some of the communications resources un-allocated.

The receiver unit of the communications device is configured with a reduced capability to receive the signals only within a frequency bandwidth which is less than the host frequency range and equal to the first frequency range and/or the second frequency range, so that the communications device is a reduced capability device.

The wireless access interface includes a plurality of time divided sub-frames, and at least one of the sub-frames includes a control channel in a part of the sub-frame for communicating first signalling data to reduced capability devices, the first signalling data identifying a location of one or more of the communications resources from which the communications device can receive common system information.

The common system information provides information which is common to both the first virtual carrier and the second virtual carrier, the common system information being valid for use by the communications device beyond the sub-frame. For example the common system information may be information which is used by the communications device to configure the transmitter unit or the receiver unit to transmit and/or receive data from the mobile communications network, such has transmission control parameters or signalling for controlling for example hand-over. Alternatively the common system information could be information which is informing a user of an early warning of a possible natural disaster or an emergency notification. The communications device includes a controller configured to control the receiver unit to receive the first signalling data from the control channel and the common system information from the one or more communications resources identified by the first signalling data.

Embodiments of the present disclosure can provide an arrangement for sharing system information which is common to communications devices which are transmitting or receiving data via a mobile communications network, in which more than one virtual carrier are provided. As explained in our co-pending International patent applications PCT/GB2012/050213, PCT/GB2012/050214, PCT/GB2012/050223 and PCT/GB2012/051326, the present disclosure is directed to providing a virtual carrier in which a set of communications resources within a host carrier are for preferable allocation to communications devices which have a reduced capability to receive signals only within a predetermined bandwidth which is less than the bandwidth of the host carrier. Such reduced capability devices may be for example MTC devices or the like. Accordingly by allocating these reduced capability devices resources within the virtual carrier, the reduced capability devices can operate within a host mobile communications system more efficiently. The present technique therefore envisages a mobile communications network in which a cell is provided with a plurality of virtual carriers. According to disclosed embodiments communications resources are used more efficiently by transmitting system information which is relevant to reduced capability devices transmitting or receiving signals via any of the virtual carriers provided within the cell. Accordingly the communications resources can be used more efficiently.

Various further aspects and embodiments of the disclosure are provided in the appended claims, including but not limited to, an infrastructure equipment (or network element of a mobile communications network), a communications device and method of communicating to a communications device using a mobile communications network element.

BRIEF DESCRIPTION OF DRAWINGS

Embodiments of the present disclosure will now be described by way of example only with reference to the accompanying drawings in which like parts are provided with corresponding reference numerals and in which.

DESCRIPTION OF EXAMPLE EMBODIMENTS

Example Network

Figure 1:
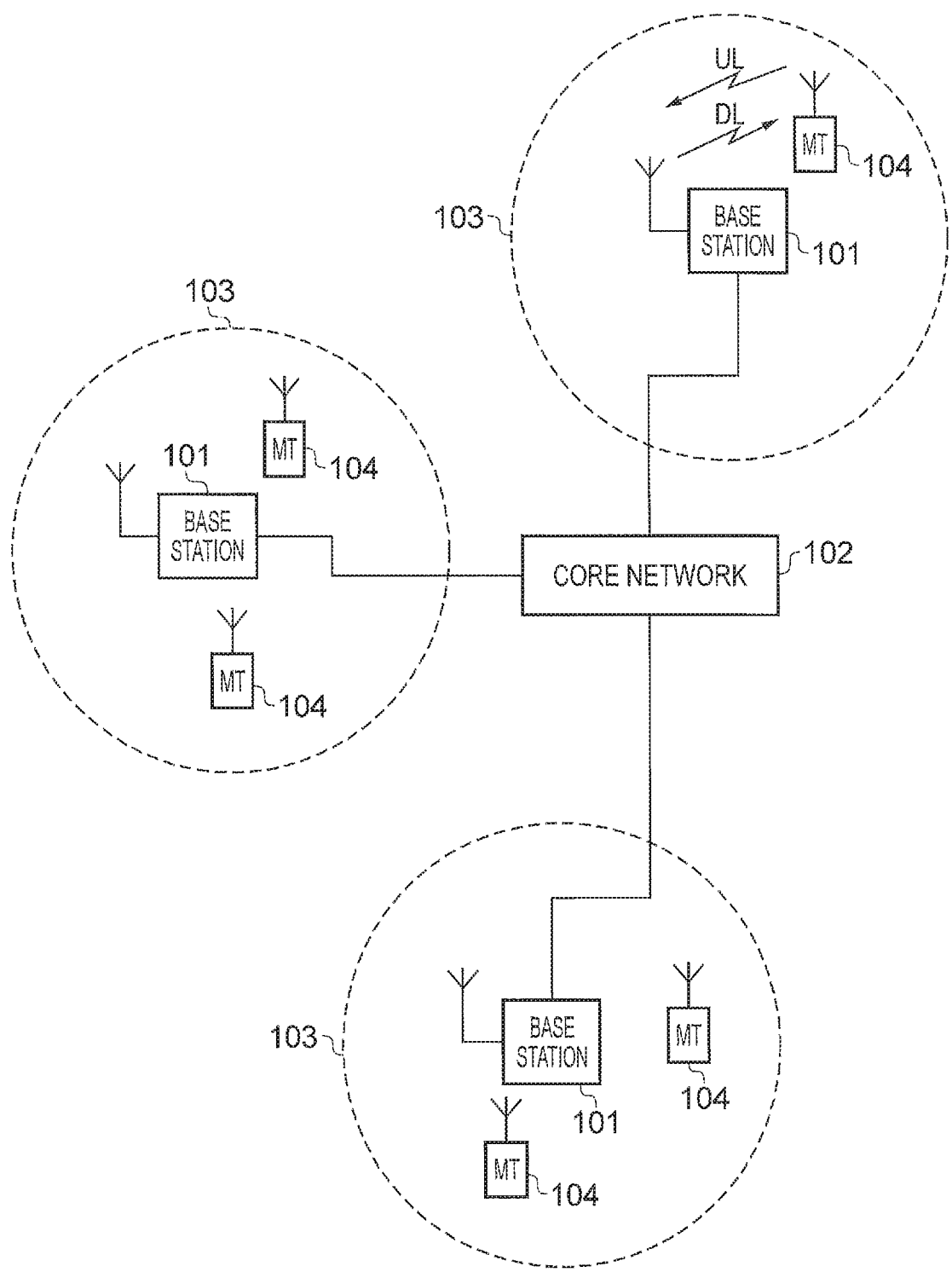
FIG. 1 provides a schematic diagram illustrating an example of a conventional mobile communications system.

FIG. 1 provides a schematic diagram illustrating the basic functionality of a conventional mobile communications system. In FIG. 1, a mobile communications network includes a plurality of base stations 101 connected to a core network 102. Each base station provides a coverage area 103 (i.e. a cell) within which data can be communicated to and from communications devices 104. Data is transmitted from a base station 101 to a communications device 104 within a coverage area 103 via a radio downlink. Data is transmitted from a communications device 104 to a base station 101 via a radio uplink. The core network 102 routes data to and from the base stations 104 and provides functions such as authentication, mobility management, charging and so on. The base stations 101 provide a wireless access interface comprising the radio uplink and the radio downlink for the communications devices and form examples of infrastructure equipment or network elements for the mobile communications network, and may be, for the example of LTE, an enhanced Node B (eNodeB or eNB).

The term communications devices will be used to refer to a communications terminal or apparatus which can transmit or receive data via the mobile communications network. Other terms may also be used for communications devices such as personal computing apparatus, remote terminal, transceiver device or user equipment (UE) which may or may not be mobile.

Figure 2:
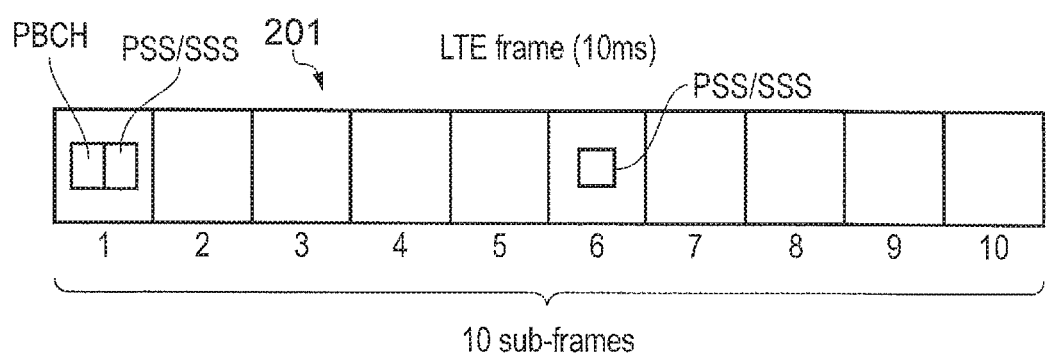
FIG. 2 provides a schematic diagram illustrating an arrangement of channels of a wireless access interface for ten down-link sub-frames of a conventional LTE wireless access interface.

Mobile telecommunications systems such as those arranged in accordance with the 3GPP defined Long Term Evolution (LTE) architecture use an orthogonal frequency division multiplex (OFDM) based radio access interface for the radio downlink (so-called OFDMA) and the radio uplink (so-called SC-FDMA). Data is transmitted on the radio uplink and on the radio downlink on a plurality of orthogonal sub-carriers. FIG. 2 shows a schematic diagram illustrating an OFDM based. LTE downlink radio frame 201. The LTE downlink radio frame is transmitted from an LTE base station and lasts 10 ms. The downlink radio frame comprises ten sub-frames, each sub-frame lasting 1 ms. A primary synchronisation signal (PSS) and a secondary synchronisation signal (SSS) are transmitted in the first and sixth sub-frames of the LTE frame, in the case of frequency division duplex (FDD) system. A physical broadcast channel (PBCH) is transmitted in the first sub-frame of the LTE frame. The PSS, SSS and PBCH are discussed in more detail below.

Figure 3:
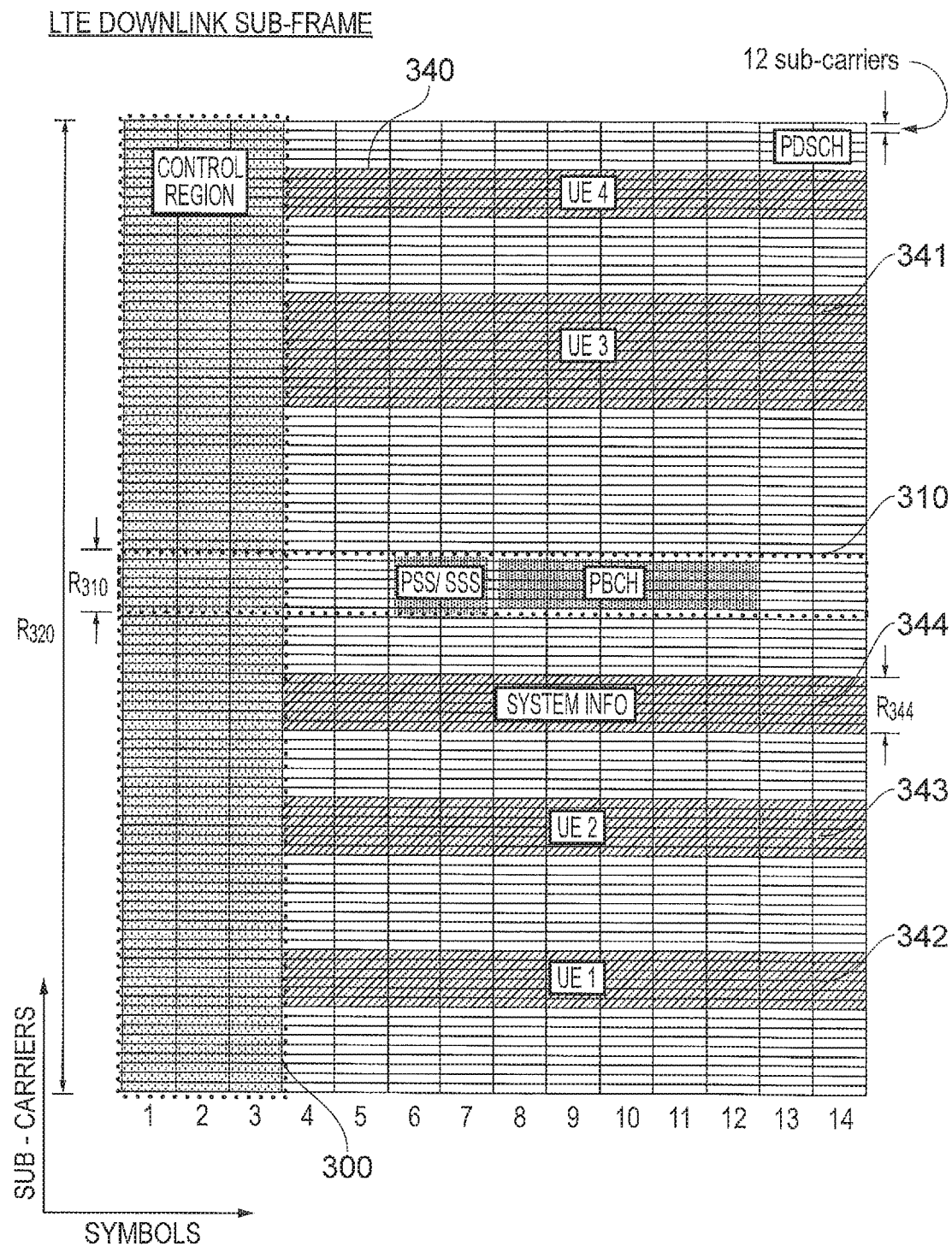
FIG. 3 provides a schematic diagram illustrating a conventional LTE downlink radio sub-frame.

FIG. 3 provides a schematic diagram providing a grid which illustrates the structure of an example of a conventional downlink LTE sub-frame. The sub-frame comprises a predetermined number of symbols which are transmitted over a 1 ms period. Each symbol comprises a predetermined number of orthogonal sub-carriers distributed across the bandwidth of the downlink radio carrier.

The example sub-frame shown in FIG. 3 comprises 14 symbols and 1200 sub-carriers spaced across a 20 MHz bandwidth. The smallest unit on which data can be transmitted in LTE is twelve sub-carriers transmitted over one sub-frame. For clarity, in FIG. 3, each individual resource element is not shown, but instead each individual box in the sub-frame grid corresponds to twelve sub-carriers transmitted on one symbol.

FIG. 3 shows resource allocations for four communications devices 340, 341, 342, 343. For example, the resource allocation 342 for a first communications device (UE 1) extends over five blocks of twelve sub-carriers, the resource allocation 343 for a second communications device (UE2) extends over six blocks of twelve sub-carriers and so on.

Control channel data is transmitted in a control region 300 of the sub-frame comprising the first n symbols of the sub-frame where n can vary between one and three symbols for channel bandwidths of 3 MHz or greater and where n can vary between two and four symbols for channel bandwidths of 1.4 MHz. The data transmitted in the control region 300 includes data transmitted on the physical downlink control channel (PDCCH), the physical control format indicator channel (PCFICH) and the physical HARQ indicator channel (PHICH).

The PDCCH contains control data indicating which sub-carriers on which symbols of the sub-frame have been allocated to specific communications devices (UEs). Thus, the PDCCH data transmitted in the control region 300 of the sub-frame shown in FIG. 3 would indicate that UE1 has been allocated the first block of resources 342, that UE2 has been allocated the second block of resources 343, and so on. In sub-frames where it is transmitted, the PCFICH contains control data indicating the duration of the control region in that sub-frame (i.e. between one and four symbols) and the PHICH contains HARQ (Hybrid Automatic Request) data indicating whether or not previously transmitted uplink data has been successfully received by the network.

In certain sub-frames, symbols in a central band 310 of the sub-frame are used for the transmission of information including the primary synchronisation signal (PSS), the secondary synchronisation signal (SSS) and the physical broadcast channel (PBCH) mentioned above. This central band 310 is typically 72 sub-carriers wide (corresponding to a transmission bandwidth of 1.08 MHz). The PSS and SSS are synchronisation signals that once detected allow a communications device 104 to achieve frame synchronisation and determine the cell identity of the base station (eNB) transmitting the downlink signal. The PBCH carries information about the cell, comprising a master information block (MIB) that includes parameters that the communications devices require to access the cell. Data transmitted to individual communications devices on the physical downlink shared channel (PDSCH) can be transmitted in the remaining blocks of communications resource elements of the sub-frame.

FIG. 3 also shows a region of PDSCH containing system information and extending over a bandwidth of $R_{344}$. Thus in FIG. 3 the central frequency band carries control channels and signals such as the PSS, SSS and PBCH and therefore implies a minimum bandwidth of a receiver of a communications device.

The number of sub-carriers in an LTE channel can vary depending on the configuration of the transmission network. Typically this variation is from 72 sub carriers contained within a 1.4 MHz channel bandwidth to 1200 sub-carriers contained within a 20 MHz channel bandwidth as shown in FIG. 3. As is known in the art, subcarriers carrying data transmitted on the PDCCH, PCFICH and PHICH are typically distributed across the entire bandwidth of the sub-frame. Therefore a conventional communications device must be able to receive the entire bandwidth of the sub-frame in order to receive and decode the control region.

Virtual Carrier

Certain classes of communications devices, such as MTC devices (e.g. semi-autonomous or autonomous wireless communication devices such as smart meters as discussed above), support communication applications that are characterised by the transmission of small amounts of data at relatively infrequent intervals and can thus be considerably less complex than conventional communications devices. Communications devices may include a high-performance LTE receiver unit capable of receiving and processing data from an LTE downlink frame across the full carrier bandwidth. However, such receiver units can be overly complex for a device which only needs to transmit or to receive small amounts of data. This may therefore limit the practicality of a widespread deployment of reduced capability MTC type devices in an LTE network. It is preferable instead to provide reduced capability devices such as MTC devices with a simpler receiver unit which is more proportionate with the amount of data likely to be transmitted to the device.

In conventional mobile telecommunication networks, data is typically transmitted from the network to the communications devices in a frequency carrier (host frequency range) where at least part of the data spans substantially the whole of the bandwidth of the frequency carrier. Normally a communications device cannot operate within the network unless it can receive and decode data spanning the host frequency carrier, i.e. a maximum system bandwidth defined by a given telecommunication standard, and therefore the use of communications devices with reduced bandwidth capability transceiver units is precluded.

However, as disclosed in co-pending International patent applications numbered PCT/GB2012/050213, PCT/GB2012/050214, PCT/GB2012/050223 and PCT/GB2012/051326, the contents of which are herein incorporated by reference, a subset of the communications resource elements comprising a conventional carrier (a "host carrier") are defined as a "virtual carrier", where the host carrier has a certain bandwidth (first frequency range) and where the virtual carrier has a reduced bandwidth compared to the host carrier's bandwidth. Data for reduced capability devices is separately transmitted on the virtual carrier set of communications resource elements. Accordingly, data transmitted on the virtual carrier can be received and decoded using a reduced complexity or capability transceiver unit.

Communications devices provided with reduced complexity or capability transceiver units (hereafter referred to as "reduced capability devices") could operate by using a part of its full capability (i.e. reduced capability set of its full capability) or they could be constructed to be less complex and less expensive than conventional LTE type devices (onwards referred to generally as communications devices). Accordingly, the deployment of such devices for MTC type applications within an LTE type network can become more attractive because the provision of the virtual carrier allows communications devices with less expensive and less complex transceiver units to be used.

Figure 4:
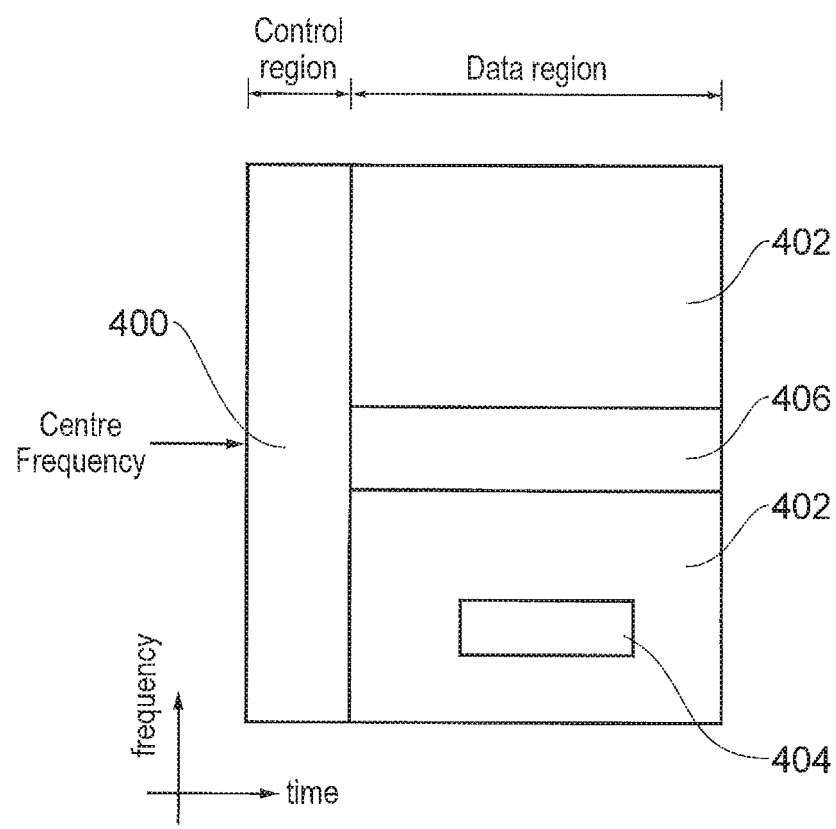
FIG. 4 provides a schematic diagram illustrating an example of an LTE downlink radio sub-frame in which a narrow band virtual carrier has been inserted at the centre frequency of the host carrier, the virtual carrier region is shown adjacent a wideband control region of the host carrier.

FIG. 4 schematically represents an arbitrary downlink sub-frame according to the established LTE standards as discussed above into which an instance of a virtual carrier 406 has been introduced. The sub-frame comprises a control region 400 supporting the PCFICH, PHICH and PDCCH channels as discussed above and a PDSCH region 402 for communicating higher-layer data (for example user-plane data and non-physical layer control-plane signalling) to respective communications devices, as well as system information, again as discussed above. The control region 400 and the shared communications resources (PDSCH) 402 therefore can occupy the entire system or host carrier bandwidth. For the sake of giving a concrete example, the frequency bandwidth (BW) of the carrier with which the sub-frame is associated is taken to be 20 MHz.

Also schematically shown in FIG. 4 by a shaded region 404 within the shared resources 402 is an example PDSCH downlink allocation to a conventional communications device. In accordance with the defined standards, and as discussed above, individual communications devices derive their specific downlink allocations 404 for a sub-frame from PDCCH transmitted in the control region 400 of the sub-frame.

By contrast with the conventional LTE arrangement, where a subset of the available PDSCH resources anywhere across the full PDSCH bandwidth could be allocated to a communications device in any given sub-frame, in the T-shaped arrangement illustrated in FIG. 4, reduced capability devices may be allocated PDSCH resources only within a pre-established restricted frequency bandwidth 406 corresponding to a virtual carrier. Accordingly, reduced capability devices each need only buffer and process a small fraction of the total PDSCH resources contained in the sub-frame to identify and extract their own data from that sub-frame.

The pre-established restricted frequency bandwidth used to communicate, e.g. on PDSCH in LTE, from a base station to a communications device, is thus narrower than the overall host frequency bandwidth (carrier bandwidth) used for communicating physical-layer control information, e.g. on PDCCH in LTE. As a result, base stations 101 may be configured to allocate downlink resources for the reduced capability device on the PDSCH 402 only within the pre-established restricted frequency bandwidth 406. As the communications device knows in advance that it will only be allocated PDSCH resources within the restricted frequency band, the communications device does not need to buffer and process any PDSCH resources from outside the pre-determined restricted frequency band.

A communications device operating with a reduced capability can therefore receive signals from the virtual carrier 406 formed by the reduced bandwidth preferred for reduced capability devices 406. For the example wireless access interface represented by the example sub-frame shown in FIG. 4, the communications devices can be arranged to buffer resource elements ready for processing. The buffered part of each sub-frame comprises a control region 400 supporting conventional physical-layer control information, such as the PCFICH, PHICH and PDCCH channels as discussed above and the restricted PDSCH region 406. The physical-layer control regions 400 that are buffered are in the same resources as the physical-layer control regions buffered by a conventional device. However, the PDSCH regions 406 which are buffered by the reduced capability device are smaller than the PDSCH regions buffered by conventional devices. This is possible because, as noted above, reduced capability devices are allocated PDSCH resources only within the preferred frequency bandwidth 406 that occupies only a part of the total PDSCH resources contained in the sub-frame. Accordingly, a reduced capability device may in a first instance receive and buffer the entire control region 400 and the entire restricted frequency band 406 in a sub-frame. The communications device may then process the control region 400 to decode PDCCH to determine what resources are allocated on PDSCH within the restricted frequency band, and may then process the data buffered during PDSCH symbols within the restricted frequency band and extract the relevant higher-layer data therefrom. The reduced capability device may process the PDSCH regions 406 quickly so that it can micro-sleep if no communications resources have been allocated to it the sub-frame. In this case the reduced capability device does not necessarily buffer the whole sub-frame before beginning work.

In one example LTE-based implementation, each sub-frame is taken to comprise 14 symbols (timeslots) with PDCCH transmitted on the first three symbols and PDSCH transmitted on the remaining 11 symbols. Furthermore, the mobile communications system is taken in this example to operate over a system frequency band of 20 MHz (100 resource blocks) with a pre-established restricted frequency band of 1.4 MHz (six resource blocks) defined for communicating with the communications devices supporting virtual carrier operation.

As explained above, in OFDM-based mobile communication systems such as LTE, downlink data is dynamically assigned to be transmitted on different sub-carriers on a sub-frame by sub-frame basis. Accordingly, in every sub-frame, the network signals which sub-carriers on which symbols contain data relevant to which communications devices (i.e. downlink allocation signalling).

Figure 5:
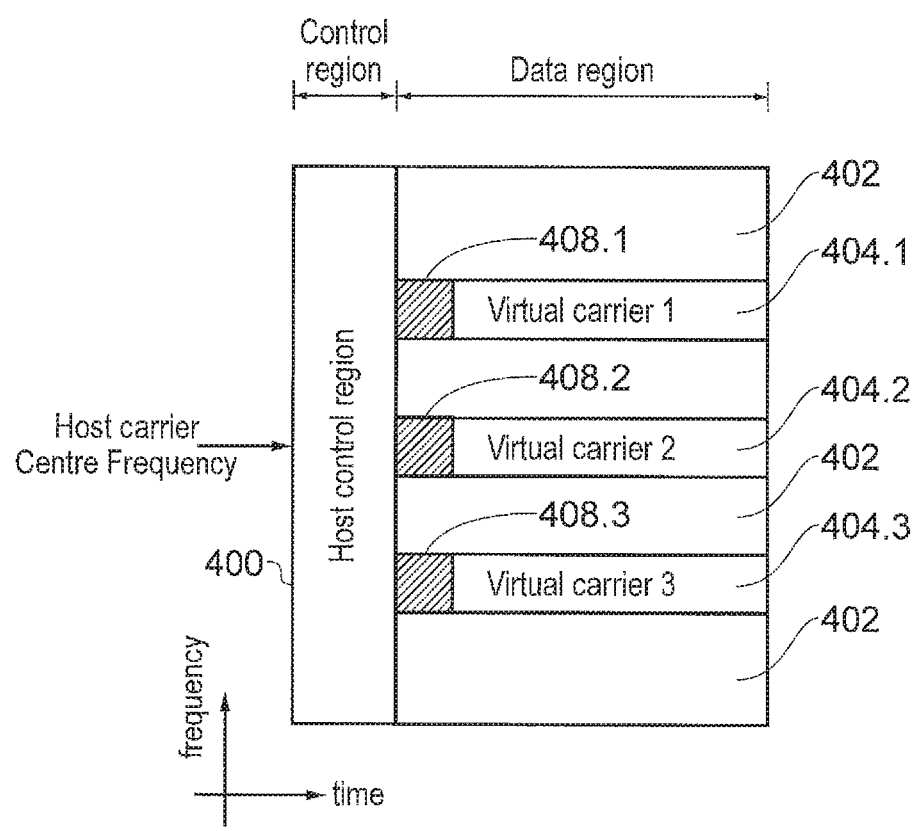
FIG. 5 provides a schematic diagram illustrating an example of a LTE downlink radio sub-frame in which a plurality of virtual carriers is provided within the host carrier.

The example shown in FIG. 4 provides an illustration in which a single virtual carrier is formed within a host carrier 406. However, as will be appreciated in any particular cell which is served by a base station 101 a wireless access interface provided by the base station may include a plurality of virtual carriers in accordance with a capacity required by reduced capability devices. Such an example of a wireless access interface supporting a plurality of virtual carriers is shown in FIG. 5. In FIG. 5 which corresponds substantially to the example shown in FIG. 4 and so corresponding parts have the same numerical reference numerals, three virtual carriers are shown 404.1, 404.2, 404.3 within the shared resources 402 provided by the host carrier. As will be appreciated in the example shown in FIG. 5 only one of the virtual carriers 404.2 is located around the centre frequency. Since the other virtual carriers 404.1, 404.3 are not located around the central frequency then these will not include the various control channels and signals which are located around the central region as explained with reference to FIG. 3 which are the PSS, SSS and PBCH. The concept of virtual carriers provided on blocks of OFDM sub-carriers that are not centred on the host carrier central frequency is known, for example, from our co-pending patent application number GB 113801.3. This describes an arrangement where a plurality of reduced capability devices are arranged to communicate via virtual carriers which are not located in the centre frequency of the host carrier. FIG. 5 therefore illustrates an LTE downlink sub-frame with a plurality of virtual carriers outside of the control region 400. The allocation of multiple virtual carriers has particular application when communications devices (UEs) using the virtual carrier create a significant quantity of traffic at a given time. It is therefore desirable that the respective subsets of devices served by each virtual carrier can locate control signals relevant to their virtual carrier.

As shown in FIG. 5, each of the virtual carriers 404.1, 404.2, 404.3 includes its own control channel region 408.1, 408.2, 408.3 which is formed within each of the virtual carriers in communications resource elements which are dedicated for communicating signalling information. For example, the control channel region could communicate resource allocation messages such as those communicated by the PDCCH within the host control region 400 to reduce capability devices for receiving signals from the corresponding virtual carrier 404.1, 404.2, 404.3. However, although the control channel regions 408.1, 4082, 408.3 of each of the virtual carriers 404.1, 404.2, 404.3 are shown at the start of the virtual carrier, it will be appreciated that this is an illustration only and in other embodiments the control channel region 408.1, 408.2, 408.3 could be formed at any other part of the virtual carrier. As an alternative, an enhanced PDCCH type channel which is narrow in bandwidth but wide in time could extend across the entire data region of the shared resources 402 but forming a narrow band section of each of the virtual carriers.

Common and UE Search Spaces for PDCCH

Having provided a control channel region 400 for receiving signalling information, the following description is provided to explain an arrangement in which communications devices can access signalling which is communicated, for example, in the PDCCH of the host carrier. By analogy the communication of signalling in a virtual carrier control region 408.1, 408.2, 408.3 can also be applied in a corresponding way.

According to an example in which the mobile communications network is configured in accordance with an LTE system, at least some of the resource elements (REs) comprising a host carrier (HC) control region are defined by specification to map onto a number of so-called control channel elements (CCEs) for transmitting signalling information. Physically, any given CCE is distributed across the REs of the HC control region. A physical downlink control channel (PDCCH) comprises a number of CCEs. The number of CCEs comprising a particular PDCCH depends on the aggregation level determined by the eNodeB. A communications device must search through some number of the CCEs in the control region to determine if there are any that comprise PDCCHs containing control information pertinent to it.

Figure 6:
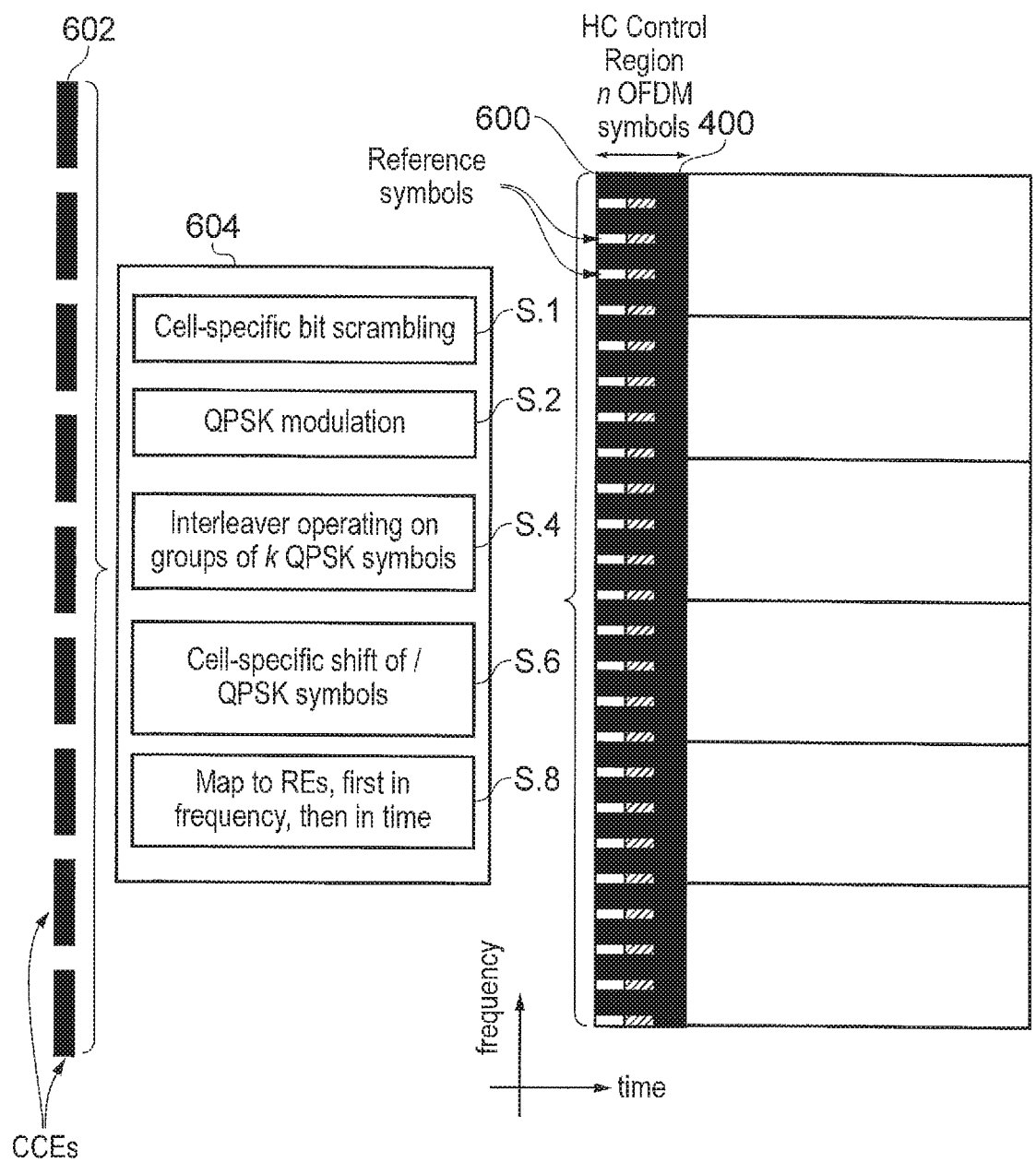
FIG. 6 provides a schematic diagram illustrating the relationship between control channel elements and resource elements within a host carrier control region.

FIG. 6 provides a schematic illustration representing an arrangement in which signalling information is transmitted to communications devices using CCEs which are mapped onto REs of the control region of the HC 400. In FIG. 6, a sub-set of REs of the HC control channel region 400 represented as REs 600 are used to carry CCEs which are encoded and arranged so that each of the communication devices can search the REs of the host control channel region 400 to recover the CCEs to decode signalling information transmitted within the host control region 400. As shown in FIG. 6, each of a plurality of CCEs 602 is adapted in accordance with a process represented within a box 604 and mapped onto the REs 600 within the FTC control region 400. The process represented within the box 604 is described as follows:

In a first step S.1, information bits representing signalling information which are used to generate the CCE's are subject to a cell specific bit scrambling. Thus for each cell the bits of the signalling information are scrambled differently. In step S2, the bits are mapped onto QPSK modulation symbols for transmission. In step S4, the QPSK modulation symbols are interleaved using an interleaver by collecting groups of QPSK modulation symbols together and interleaving those symbols in frequency. In step S6, a cell-specific shift of i QPSK symbols is performed where i is a predetermined number of those QPSK symbols. Finally in step S8, the groups of i QPSK symbols are mapped onto REs 600 within the host control channel region 400 first in frequency and then in time. Thus the REs represent sub-carriers of OFDM symbols so that as shown in FIG. 6 each of the REs is arranged to carry a QPSK symbol according to the mapping created by the CCE's as explained above.

The locations of CCEs forming PDCCHs can be arranged by the eNodeB to make the search process by the communications devices more efficient by arranging CCEs for different purposes in logical "search spaces". Some CCEs are searched (monitored) by all communications devices in the cell, these CCEs comprising one or more common search spaces (CSS). The order in which the CCEs of the CSSs within each sub-frame are searched by communications devices remains static and is given by the specification (i.e. not configured by RRC). Some CCEs are not searched by all communications devices, these CCEs comprising a plurality of search spaces which are specific to communications devices or UEs and are referred to as UE-specific search spaces (UESS). The order in which the CCEs of the UESSs for a given communications device within each sub-frame are searched is dependent upon the relevant cell radio access network temporary identifier (C-RNTI) for that communications device: the CCEs with which any one communications device begins searching a UESS will also change between sub-frames within a radio frame. Depending upon the context within a communication session, the RNTI may take one of a number of forms. Thus data that is UE specific uses either a C-RNTI or a temporary C-RNTI; data intended for broadcast of system information uses a SI-RNTI (system information RNTI); paging signals use a P-RNTI (paging RNTI); messages concerning the random access procedure (RA procedure) use RA-RNTI (random access RNTI), etc. RNTIs are assigned from a range of 16-bit values, and specifications restrict which RNTIs may be taken from which ranges within the total possible range.

A CCE may be part of more than one search space. Typically, PDCCHs comprising CCEs in a common search space contain information relevant to all Communications devices in a cell and the PDCCHs comprising CCEs in a communications device-specific search space contain information relevant only to one communications device. A typical blind decoding process will make around ten attempts to decode common search space. The number of attempts may be restricted as the CSS is limited to only certain Downlink Control Information (DCI) formats (i.e. 0, 1A, 3, 3A—see 3GPP TS 36.212)—which carry data relevant to all Communications devices in the cell. Furthermore the size of the CSS is restricted to a predefined number of REs (e.g. 144 REs=2 aggregations of 8-CCEs or 4 aggregations of 4-CCEs). By contrast, many more blind decoding attempts (~30) are typically required to decode communications device-specific search space (UESS) successfully: more possibilities are available to the eNB in terms of the level of aggregation applied to UESS and in terms of DCI formats for data directed to specific communications devices.

As will be appreciated from the explanation, resource allocation messages which are transmitted on the PDCCH are used to allocate resources for the sub-frame and therefore do not have any relevance outside the sub-frame in which they are transmitted. In contrast, as explained below, SI is used by the communications devices to configure transmitting and receiving signals beyond the sub-frame.

Common System Information Between Virtual Carriers

Some of the fundamental information required for a communications device to operate in a cell is transmitted on the PBCH in the Master Information Block (MIB). The rest of the broadcast information regarding the system configuration is transmitted in system information (SI) messages on the PDSCH. The PDSCH resource allocations for the SI messages are transmitted on a PDCCH addressed to the SI-RNTI. In current proposals for LTE, the SI is divided into thirteen System Information Blocks (SIBs). The SIBs are transmitted in the SI messages, of which a cell may broadcast several at different periodicities.

Embodiments of the present technique can provide SI for use by reduced capability devices which are communicating using more, than one virtual carrier (VC) within a cell. Example embodiments are configured to provide VC-common/-specific SI information for the communications devices to acquire information about the network. In carrier aggregation (CA) techniques, SI for secondary cells (Scell) is provided by RRC signalling on the primary cell (Pcell). If the Scell SI changes, the Scell is released and re-added to the set of component carriers (CCs) and the updated SI is provided once again on the Pcell. In contrast some embodiments of the present disclosure split the SI between two locations, with some of it being in common with another carrier. Furthermore devices on more than one VC access a common set of SI messages. As will be explained, in some embodiments, the VCs are partially aggregated for the purpose of transmitting the common SI messages.

Figure 7:
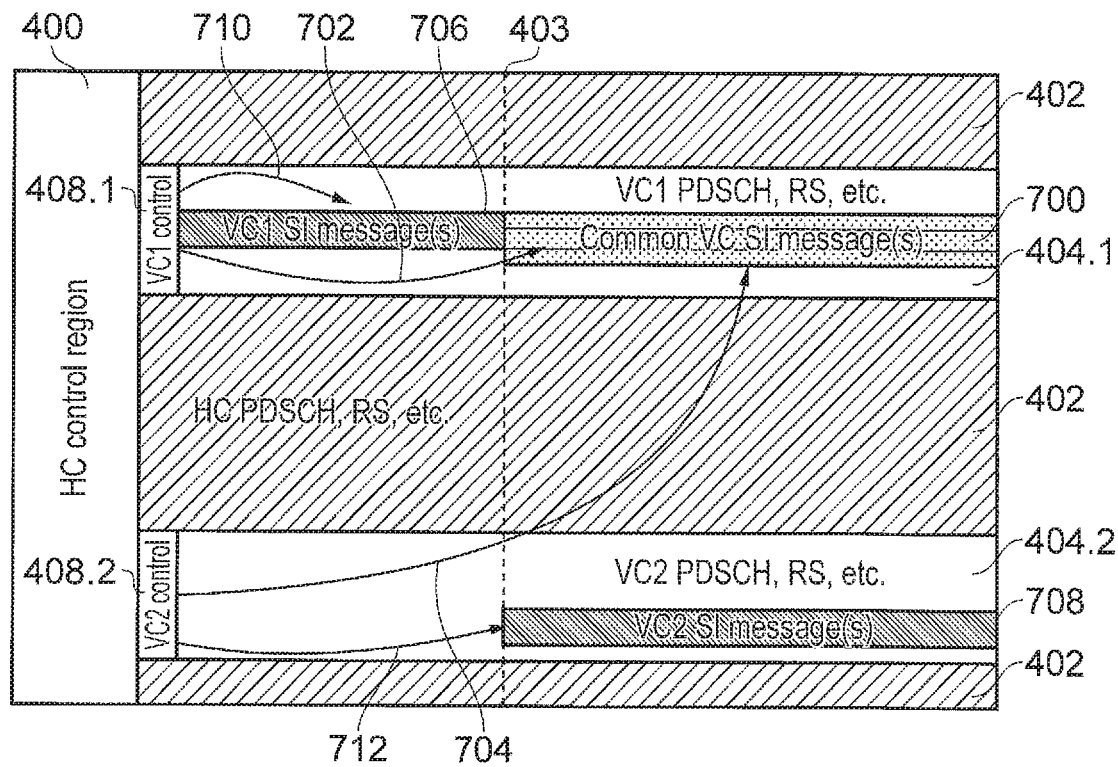
FIG. 7 is a representation of a wireless access interface in which a host carrier includes first and second virtual carriers according to an example embodiment of the present technique.

Example embodiments of the present technique will now be described with reference to FIGS. 7 to 15. FIG. 7 provides an illustrative representation of the sub-frame of a wireless access interface which has been adapted in accordance with the present technique. In FIG. 7, a host control region 400 is shown as it appears in FIGS. 3 to 6. The example shown in FIG. 7 includes two virtual carriers (VCs) 404.1, 404.2, which are formed with two time slots of the sub-frame represented in FIG. 7 by a dotted line 403. Each of the VCs includes a VC control region 408.1, 408.2. In addition the shared resources of the PDCCH of the HC are shown within a region 402. Each of the VCs 404.1, 404.2 is formed within the HC frequency bandwidth in a section having first and second preferred frequency ranges respectively. As shown in FIG. 7 one of the VCs 404.1 includes a common VC-SI message within the shared resources 700 of the second VC 404.2. The information transmitted in the common VC-SI message 700 is common to reduced capability devices receiving information from both the first VC 404.1 and the second VC 404.2. Accordingly, first and second arrows 702, 704 represent an indication provided to the reduced capability devices transmitted in first signalling information from a control channel in the control channel region 408.1, 408.2 of each of the first and second VCs 404.1, 404.2 which indicate the location of the common VC-SI 700.

According to the example embodiment shown in FIG. 7, there are two virtual carriers (VCs) 404.1, 404.2 operating within a HC although there could be more. The HC SI messages are scheduled as usual in remaining FTC PDSCH resources. However, the VC SI messages are split such that any common SI is contained in SIBs which are carried by SI messages that are scheduled in identified resources on one of the VCs. Each VC then also has further SI messages scheduled within its own (VC) PDSCH resources to provide VC-specific SIBs. The identification of the resources containing the common SI messages could be provided in the common search space (CSS) PDCCH of each VC, with a suitable RNTI.

In the example shown in FIG. 7, communications resources are allocated to communications devices, but the communications resources need not necessarily be contiguous in frequency. Illustratively, VC-specific SI message allocations have been shown in two resource blocks, and VC-common SI messages have been shown in three resource blocks. As will be appreciated however, these are just illustrative numbers of resource blocks and other allocations of resource blocks could be made for the VC-specific SI and the VC-common SI messages.

As will be appreciated embodiments of the present technique provide an arrangement which the base station (eNodeB) identifies SI which is common to reduced capability devices receiving signals on the first and second VCs 404.1, 404.2. The base station then transmits this common SI in one or more of the communications resources 700 of the HC. In contrast, SI which is specific to the VC serving the reduced capability devices is transmitted in a separate location shown in FIG. 7 as a group of REs 706, 708 for respectively the first and second VCs 404.1, 404.2. First signalling data and second signalling data which is transmitted from respectively the VC control channel regions 408.1, 408.2 on control channels direct the reduced capability devices to the common SI and the VC-SI on the first and second VCs 404.1, 404.2 as indicated by arrows 710, 712. Accordingly embodiments of the present invention provide a base station which is arranged to identify SI which is common to each VC 404.1, 404.2 or specific VC-SI and transmits this information on the REs 706, 708 separately from common SI transmitted in the REs 700. The base station directs the reduced capability devices respectively to the specific VC-SI and common SI using first and second signalling data transmitted from the respective control regions 408.1 and 408.2. Accordingly, by separately identifying common SI, a saving can be made in respect of communications resources because these are used more efficiently to transmit common information which otherwise would have been transmitted using separate REs of the wireless access interface.

A reduced capability device or VC-UE would thus, having located the control region of the VC, by methods previously disclosed, proceed to decode the SI messages within its VC's PDSCH region as well as the common SI messages in other resources on a VC before continuing with the usual sub-frame decoding procedures. There may be a need for the reduced capability device to interpret the information in the common SI messages in different ways depending on what SI is provided in the VC-specific SI messages, and vice-versa.

Figure 8:
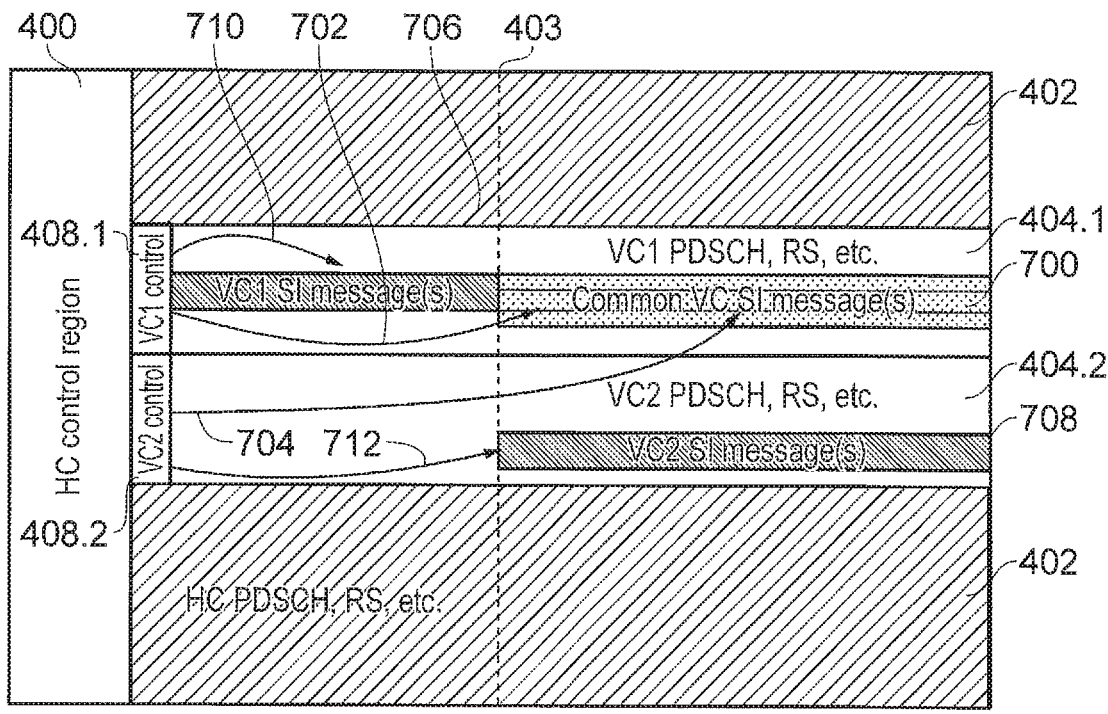
FIG. 8 is a representation of a wireless access interface corresponding to that shown in FIG. 7 illustrating an example embodiment in which first and second virtual carriers are closely located within a host carrier.

FIG. 8 provides an example embodiment corresponding to the example shown in FIG. 7 except that the respective first and second frequency ranges of the first and second VCs 404.1, 404.2 are arranged to be closely located or substantially contiguous. In the example embodiment presented in FIG. 8, the VC PDSCH resources in which signalling information identifying the location of the common SI messages is localised in time and frequency, or distributed in a manner determined by scheduling and Resource Allocation Type. The VCs sharing the common SI are closely spaced in the frequency domain, which as shown in FIG. 8. In one example the first frequency range of the first VC and the second frequency range of the second VC may be substantially contiguous or at least closely related. This allows a communications device to be constructed with a reduced capability because a maximum bandwidth, which is required to receive both specific SI messages and common SI massages contemporaneously can result in a cost reduction.

SI Change Notifications

SI change notification can be implemented separately for the common SI messages and the VC-specific SI messages. In one example a base station forming a cell could transmit paging messages to inform the reduced capability devices to change between an RRC_IDLE state or an RRC_CONNECTED state using separate SystemInfoModification flags. Such SystemInfoModification flags could be created and carried in Paging messages, which are transmitted to reduced capability devices (VC-UEs) from each VC. Furthermore separate systemInfoValue flags could be transmitted within a SI message, such as SIB1 to reduced capability devices which are in the RRC_CONNECTED state, informing the devices that the SI has changed, which may be both specific SI and common SI. For this purpose two sets of SI could be created one for common SI and one for VC-specific SI. In terms of implementation, to determine which of the two sets of SI messages need to be updated, the list of SIBs that need changing could be inspected. For example, if SIB1 has changed, it is likely that many SIBs will be affected and that both the VC-common and VC-specific SI messages will need updating. On the other hand, if only some new SI message introduced to handle VCs has been changed, then only the SI messages containing those SIBs would need updating.

In other example embodiments, the change notification process could be left essentially unchanged, and any time either VC-common or VC-specific SI changes, the existing change notification procedures are used, on the relevant VC(s).

Similar variations could apply to separate SI change notifications providing early warning for natural disasters such as for the Earthquake and Tsunami Warning Service (ETWS), which for the example of LTE are transmitted in SIBs 10 and 11 and the Commercial Mobile Alert Service (CMAS) in SIB 12, which may each have a separate change notification process.

Examples of Common and VC-Specific SI

For the example of LTE, there are a number of SIBs containing many different parameters, so it will be appreciate that no examples could be comprehensive. However, below are suggested some examples of SI that may be VC-common or VC-specific, which according to some embodiments are applied to an LTE mobile communications network.

For example from the explanation above it will be appreciated that SIBs which are associated with ETWS and CMAS would be therefore common to all VCs within a HC. The HC is effectively formed by a base station within a cell of the mobile communications network, which provides the wireless access interface forming the HC. Therefore emergency alerts would be likely to apply to the entire cell. In one example, the contents of SIBs 10, 11 and 12 could be common across all VCs in a HC. In other examples, SIBs 3, 4, 5, 6, 7 and 8 deal with the various kinds of cell re-selection. Since VCs within an HC are formed within the wireless access interface for one cell, this cell-reselection information could be common across at least some VCs. There is the possibility that a base station (eNB) may wish to have slightly different handover behaviour among its various VCs. In this case at least some parts of the relevant SIBs may become VC-specific instead. For example, SIB4 contains configurations for intra-frequency cell re-selection. Different neighbouring cells may have different VC support capabilities, perhaps in different parts of the bandwidth and so it may not be suitable for a reduced capability device fixed to a given VC on a first cell to be handed over to any VC on a second cell. However reduced capability devices on a different VC on a first cell may be compatible with a VC capability of a second cell and thus a hand-over could be made, depending on the radio conditions. The intra-frequency cell re-selection information would evidently be different in these two cases.

In one example, one system information block (SIB), may provide the scheduling of the transmission of the other SI whether common or specific, such as SIB1 for LTE which contains, amongst other things, the scheduling information for the other SIBs. Since each VC could have different schedules for the other SIBs, at least the scheduling parts of SIB1 may be VC-specific. Other parts of SIB1 (in a particular example csg-Indication and csg-Identity) are likely to be common across VCs. Thus in this example one SIB can have some parts common to all VCs and other parts specific per-VC.

As will be appreciated from the above example, a base station of the mobile communications network adapted in accordance with the present technique, may examine the SI which is to be communicated to reduced capability devices and form the SI into SI which is common to reduced capability devices operating on different VCs and SI which is specific to a VC. Accordingly the base station arranges to transmit the common SI in a specific location, which is identified to the reduced capability devices by transmitting signalling information via a control channel, such as that formed by the control channel regions 408.1, 408.2. The specific SI is therefore also identified using signalling information transmitted to the reduced capability devices via the control channel, but identifying communications resources on the VC where the devices may detect the specific SI.

In one example a specific SIB (or SIBs) carrying information relevant to VCs only may be used to transmit information which is specific to reduced capability devices. Some parameters that could be in such a SIB could include:
- Frequency locations of other VCs (e.g. to allow UE measurements of them)
- Information on splitting of SIBs which are part VC-common and part VC-specific. In such a SIB, that SIB itself evidently could not be so split.
- Intra-carrier VC re-selection information, analogous to e.g. SIB5 but relevant within a carrier containing multiple VCs.

Common SI Messages Carried on HC

Figure 9:
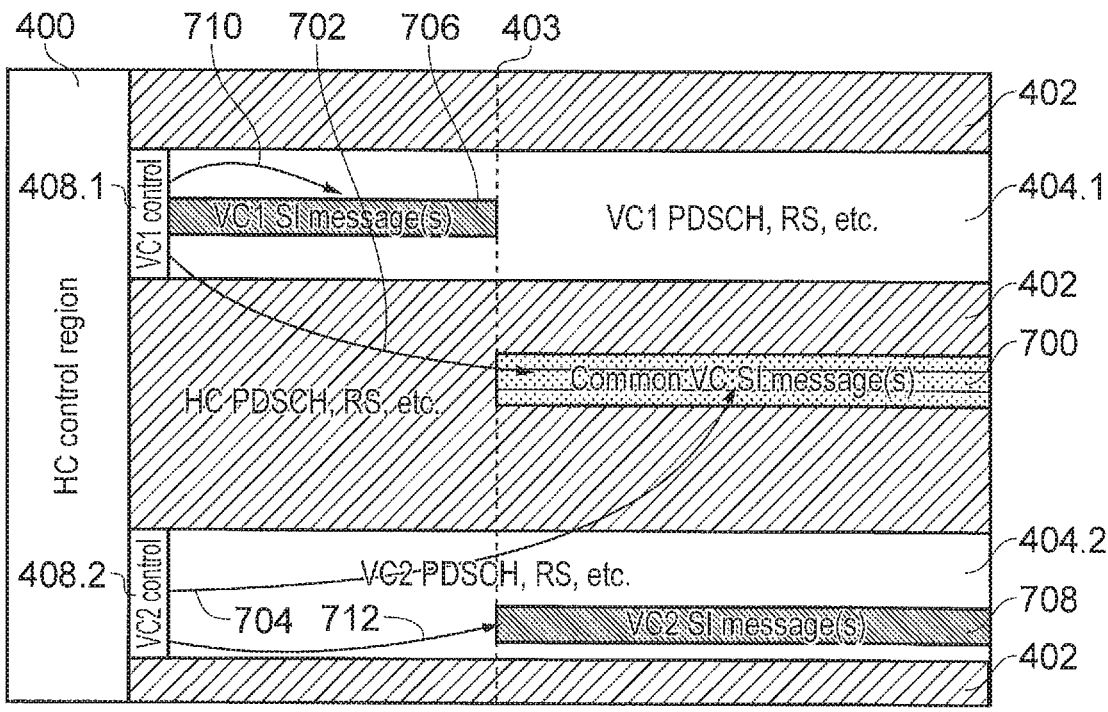
FIG. 9 is a representation of a wireless access interface corresponding to that shown in FIG. 7 illustrating an example embodiment in which communications resources which are used to transmit common system information which is common for reduced capability devices receiving signals from first and second virtual carriers is located within shared resources of a host carrier.

According to some embodiments of the present technique illustrated in FIG. 9, which corresponds substantially to the examples shown in FIGS. 7 and 8, the common SI messages are transmitted in identified REs 700 in the HC. As with the embodiments explained above, a reduced capability device decodes both these common SI messages and any VC-specific SI messages addressed in the VC control region.

FIG. 9 provides a further illustrative example embodiment which corresponds to the examples illustrated in FIGS. 7 and 8. However, unlike the embodiments shown in FIGS. 7 and 8, in FIG. 9 the common VC-SI block 700 is located within the shared resources of the HC 402 and outside the first and second VCs. Thus according to the examples shown in FIG. 9 a reduced capability device could have to retune its receiver to receive the common VC-SI within the REs 700, which may also be common to conventional communications devices communicating via the HC.

Common SI Messages Carried on Aggregated VC Resources

Figure 10:
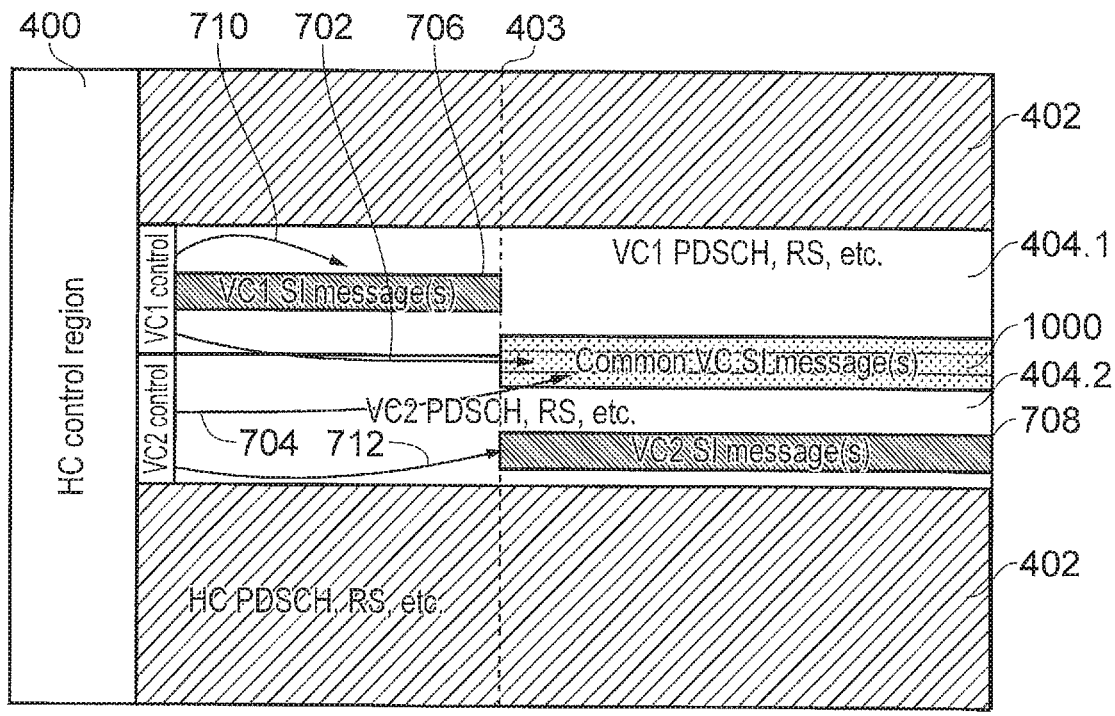
FIG. 10 is a representation of a wireless access interface corresponding to that shown in FIG. 7 illustrating an example embodiment in which first and second virtual carriers are closely located within a host earlier and in which communications resources which are used to transmit common system information which is common for reduced capability devices receiving signals from first and second virtual carriers is located within both the first and second virtual carriers.
Figure 11:
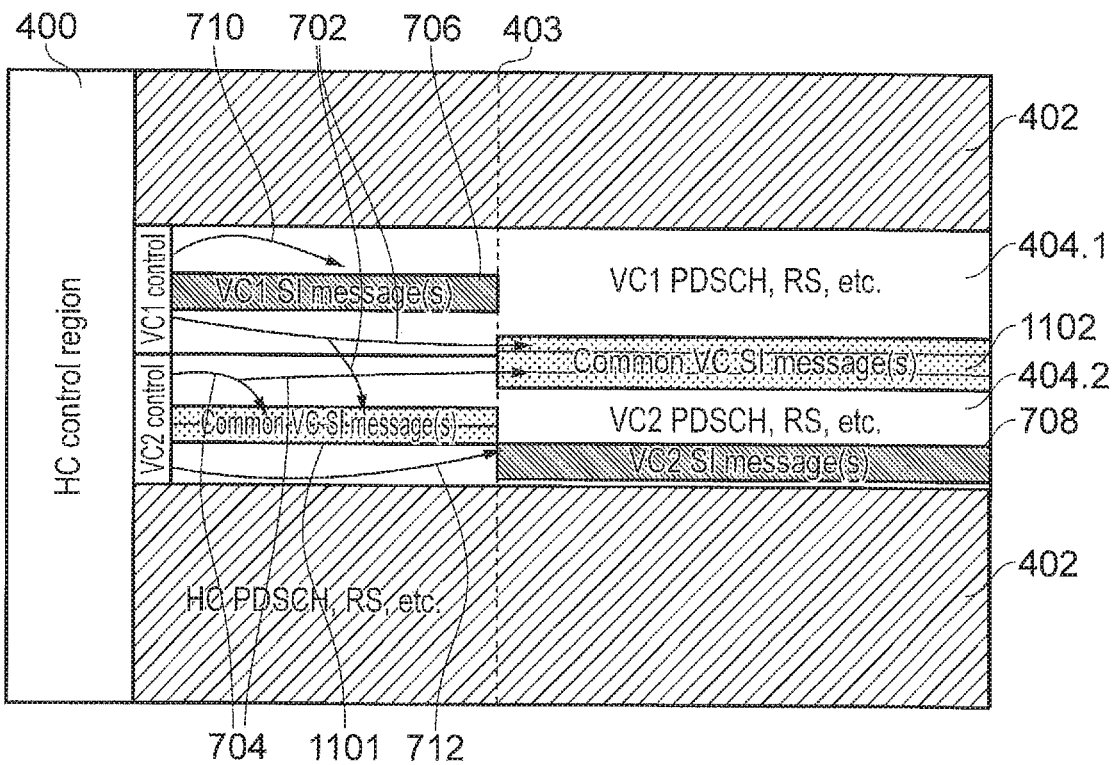
FIG. 11 is a representation of a wireless access interface corresponding to that shown in FIG. 7 illustrating an example embodiment in which first and second virtual carriers are closely located within a host carrier and in which communications resources which are used to transmit common system information which is common for reduced capability devices receiving signals from first and second virtual carriers is located within both the first and second virtual carriers and displaced in time.

Further example embodiments are illustrated in FIGS. 10 and 11, which correspond substantially to the examples shown in FIGS. 7, 8 and 9. However in the embodiments illustrated in FIGS. 10 and 11 the common SI messages are localised in time and frequency.

FIGS. 10 and 11 provide further example embodiments in which, like the arrangement shown in FIG. 8, the first and second VCs are formed from the first and second frequency ranges, which are substantially contiguous or at least closely located. Accordingly, for the examples shown in FIG. 10 the common VC-SI is transmitted on REs, which spans both the first and second VCs thereby increasing frequency diversity in respect of the transmission of the common SI. Correspondingly the example shown in FIG. 11 also communicates the common SI on REs which form part of both the first and second VCs within respectively the first and second frequency ranges. However, for the example shown in FIG. 11 the resource blocks which are dedicated for the communication of the common SI respectively on the first VC and the second VC are offset in time so that time diversity as well as frequency diversity is provided for the transmission of the common SI.

However, these resources are aggregated from more than one VC. This has the advantage of reducing the resource lost to overhead on one VC compared to the embodiments of FIGS. 7 and 8, and could provide increased frequency diversity for the common SI messages. A difference between the embodiments of FIGS. 10 and 11, is that the example shown in FIG. 11 is adapted to transmit the common SI using a localised resource 1101, 1102 reserved on each SI-aggregated VC but these resources are not in the same OFDM symbols on the VCs. Thus in FIG. 11, no particular time-domain relationship is implied between the resources allocated to carry the common SI. Preferably, to simplify or at least reduced the cost of the reduced capability devices operating on the VCs, the VCs operating in this way would be close together in frequency, but in general there is no particular constraint of this type. As shown in FIG. 11, the total resource allocated to the VC-common SI messages is divided between the resource blocks in the two time slots, which are marked in the sub-frame by the dotted line 403. However the resources 1101, 1102 allocated are provided to communicate one VC-common SI message.

Figure 12:
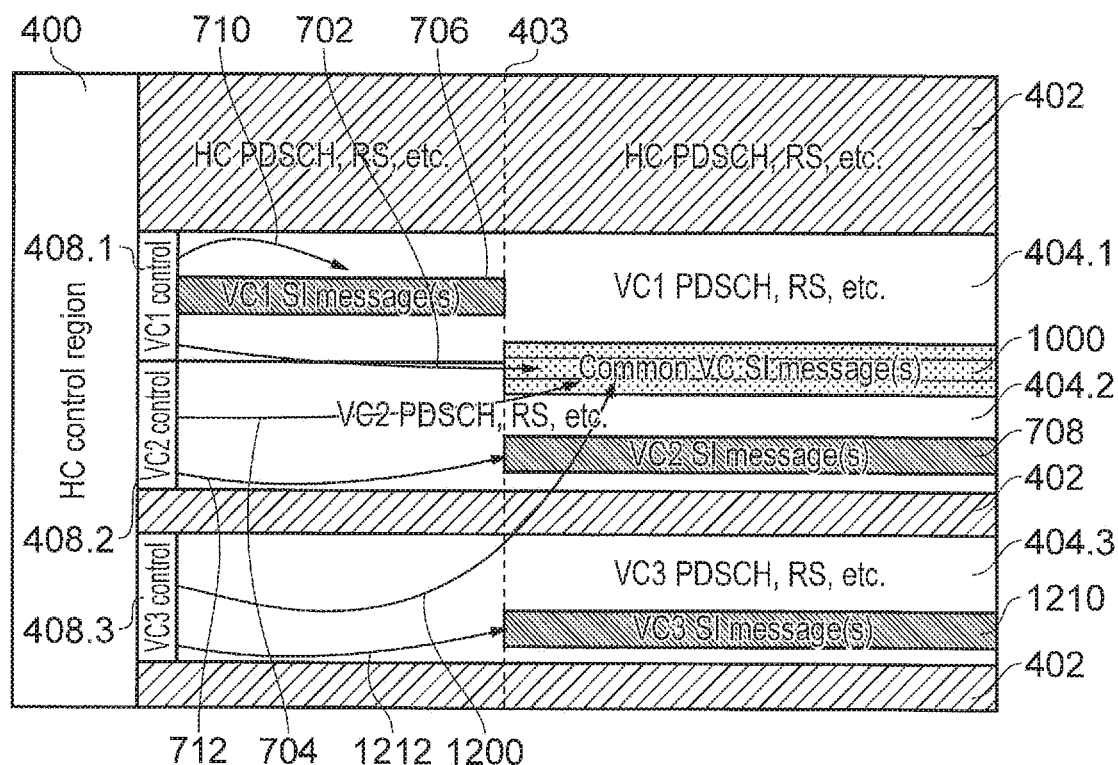
FIG. 12 is a representation of a wireless access interface corresponding to that shown in FIG. 10 illustrating an example embodiment in which a third virtual carrier is provided within the host carrier.

FIG. 12 provides a further example embodiment which corresponds substantially to the embodiment shown in FIG. 10 except that the example embodiment of FIG. 12 illustrates a third VC 404.3. As will be appreciated with regard to the embodiments explained above, there is no particular restriction on how many VCs may be used within a wireless access interface. For example, although the common SI messages may be in resources aggregated from the two VCs are in the examples in FIGS. 10 and 11, there could be a third 404.3 or further VCs which reference that resource without the SI messages occupying any resource in the third or further VCs. As for the example explained with reference to FIG. 10, the common SI 1000 is transmitted across frequencies of both the first and second VCs 404.1, 404.2 providing frequency diversity. The third VC therefore transmits first signalling data 1200 to reduce capability devices operating on the third VC 404.3 by directing the reduced capability devices to receive the common SI from the REs 1000 of the first and second VCs 404.1, 404.2. Thus as illustrated by an arrow 1200, a control channel formed within the control region of the third VC 404.3 directs the reduced capability devices to the common SI transmitted in the REs 1000 of the first and second VCs 404.1, 404.2. As for the other examples a second signalling message 1212 is transmitted from the control channel 408.3 to direct the communications devices to the VC-specific SI 1210.

Common SI Messages Scheduled on Grouped PDCCH

In a further example embodiment instead of the signalling data identifying the REs for the common SI messages being transmitted on PDCCH in the control region of each VC, they are instead indicated in a relevant grouped PDCCH on the group-specific search space disclosed as disclosed in our co-pending UK patent application GB1221729.5. To address the potential capacity problem in the HC control region (i.e. the PDCCH), our co-pending UK patent application GB1221729.5 discloses a group-specific search space (GSS) for PDCCH which conveys control information common to a group of the communications devices receiving the PDCCH in a given sub-frame, but which is not common to all such communications devices. This group-based control information may be adapted to inform members of a group of reduced capability devices where a further control channel can be found which contains information specific to, on the one hand, the structure and operation of the VC and, on the other hand, the usual information conveyed per-communications device on the PDCCH. More generally this allows information common to a group of communications devices, but not intended for broadcast to all communications devices, to be signalled efficiently on the PDCCH. By defining group search spaces, more efficient use can be made of the PDCCH capacity without imposing an unnecessary processing load on conventional communications devices or fundamentally altering the mapping between CCEs and REs (illustrated in FIG. 6). The group-specific search space will not be explained in detail here. However a brief explanation is provided in Annex 1.

According to this embodiment, a base station operating in the cell may transmit signaling information to reduced capability devices which are divided into groups. The signaling information is transmitted on resources of the PDCCH control region using the group specific search space.

VC Diversity for Common SI Messages

In some embodiments, if resources allow, the common SI messages may be transmitted on more than one VC in the same sub-frame. Reduced capability devices can receive indications from the VC-PDCCH of the location of the common SI message transmissions and have the option (or requirement) to use more than one such simultaneous transmission to benefit from frequency diversity. This would imply that the reduced capability device is able to operate in a bandwidth of more than one VC at a time and thus may not be as low-cost, and bandwidth-restricted as more simple reduced capability devices which can only receive signals on one VC.

Time Diversity for Common SI Messages

In further example embodiments, the common SI messages are transmitted in more than one successive sub-frame to give a communications device an option of using time diverse processing to improve reception of the SIBs. The time diversity order with which each SI message is going to be transmitted could be embedded in a new information element in SIB1 on the VC.

Common SI in Conventional Carrier Aggregation

In further example embodiments, which operate in accordance with one or more of the embodiments explained above, a plurality of HCs may be aggregated to pool communications resources on different frequency channels. According to these example embodiments two or more conventional carriers are combined, which may be directly adjacent in frequency, but are under the control of one base station (eNB). According to the present technique, a control channel such as the PDCCH, in the example of LTE, on one of the plurality of HCs, transmits the signalling information according to the embodiments described above which directs reduced capability devices to the resources for the common SI. Further carrier-specific SI can be treated in the way that all SI is presently treated in carrier aggregation. The conventional carriers considered in this embodiment may in fact be HCs containing VCs. Other embodiments can be arranged to aggregate the resources of the HCs and the VCs separately.

Example Mobile Communications System

Figure 13:
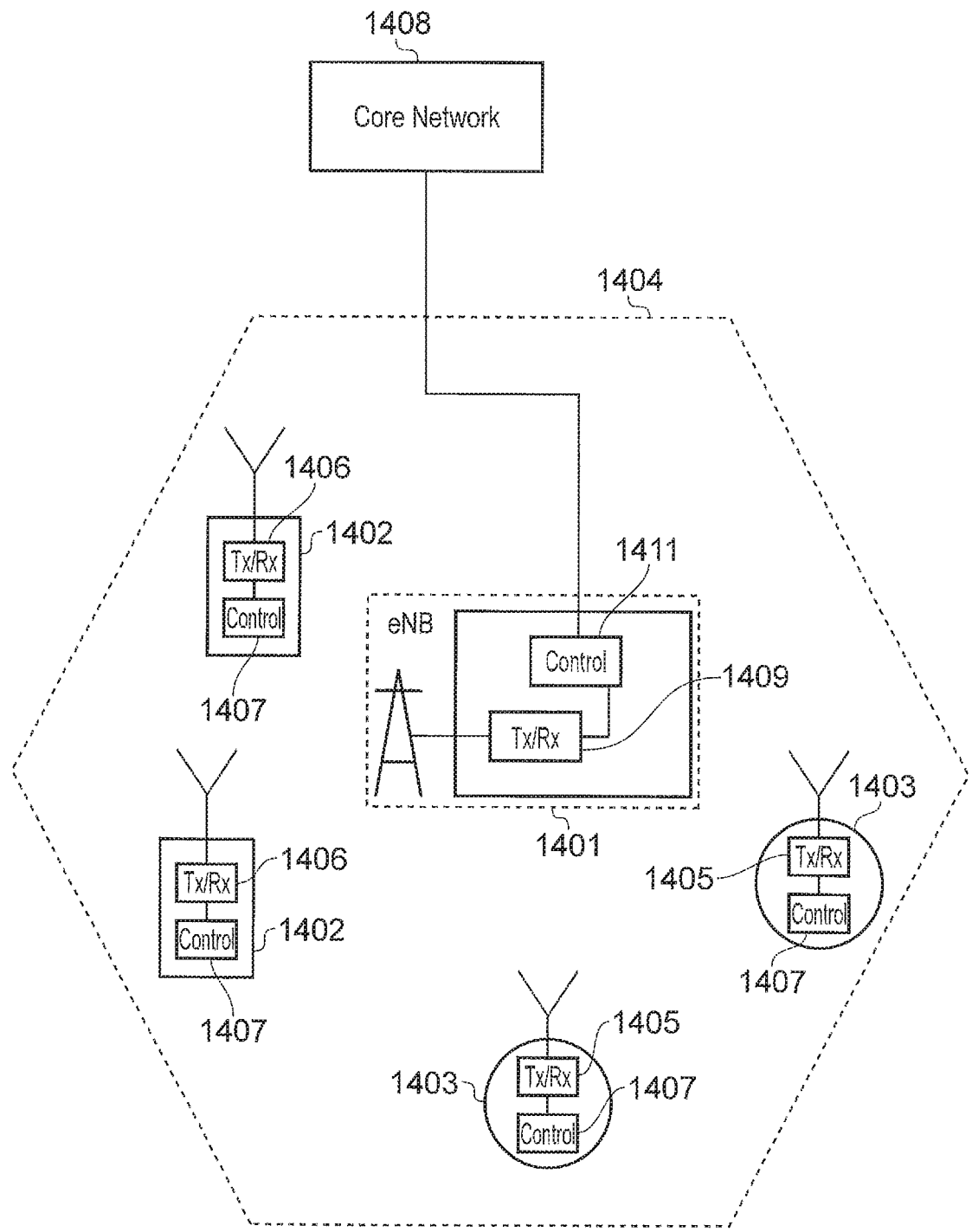
FIG. 13 is a schematic block diagram of a mobile communications system according to one example of the present technique.

FIG. 13 provides a schematic diagram showing part of an adapted LTE mobile communications system. The system includes an adapted enhanced Node B (eNB) 1401 connected to a core network 1408 which communicates data to a plurality of conventional communications devices 1402 and reduced capability devices 1403 within a coverage area (i.e. cell) 1404. Each of the reduced capability devices 1403 has a transceiver unit 1405 which includes a receiver unit capable of receiving data across a reduced bandwidth and a transmitter unit capable of transmitting data across a reduced bandwidth (or full bandwidth of an uplink carrier supported by the eNB 1401) when compared with the capabilities of the transceiver units 1406 included in the conventional communications devices 1402.

The adapted eNodeB 1401 is arranged to transmit downlink data using a sub-frame structure that includes a VC as described above for example with reference to FIGS. 7 to 12. A transmitter and receiver unit 1409 forms a wireless access interface under the control of a controller 1411, which also performs the function of an adapted scheduler. The reduced capability devices 1403 are thus able to receive and transmit data using the uplink and/or downlink VCs as described above and to receive signalling information identifying the location of common SI on one of the VCs or in the HC.

As has been explained above, because the reduced complexity devices 1403 receive data across a reduced bandwidth downlink VCs, the complexity, power consumption and cost of the transceiver unit 1405 needed to receive and decode downlink data and to encode and transmit uplink data is reduced compared to the transceiver unit 1406 provided in the conventional communications devices.

When receiving downlink data from the core network 1408 to be transmitted to one of the devices within the cell 1404, the adapted eNodeB 1401 is arranged to determine if the data is bound for a conventional communications device 1402 or a reduced capability device 1403. This can be achieved using any suitable technique. For example, data bound for a reduced capability device 1403 may include a VC flag indicating that the data must be transmitted on the downlink VC. If the adapted eNodeB 1401 detects that downlink data is to be transmitted to a reduced capability device 1403, a controller 1411 included in the adapted eNodeB 1401 ensures that the downlink data is transmitted to the reduced capability device in question on the downlink VC. In another example the network is arranged so that the VC is logically independent of the eNodeB. More particularly the VC can be arranged to appear to the core network as a distinct cell. From the perspective of the core network it is not known that the VC is physically co-located with, or has any interaction with, the HC of the cell. Packets are routed to/from the VC just as they would be for any normal cell.

Figure 14:
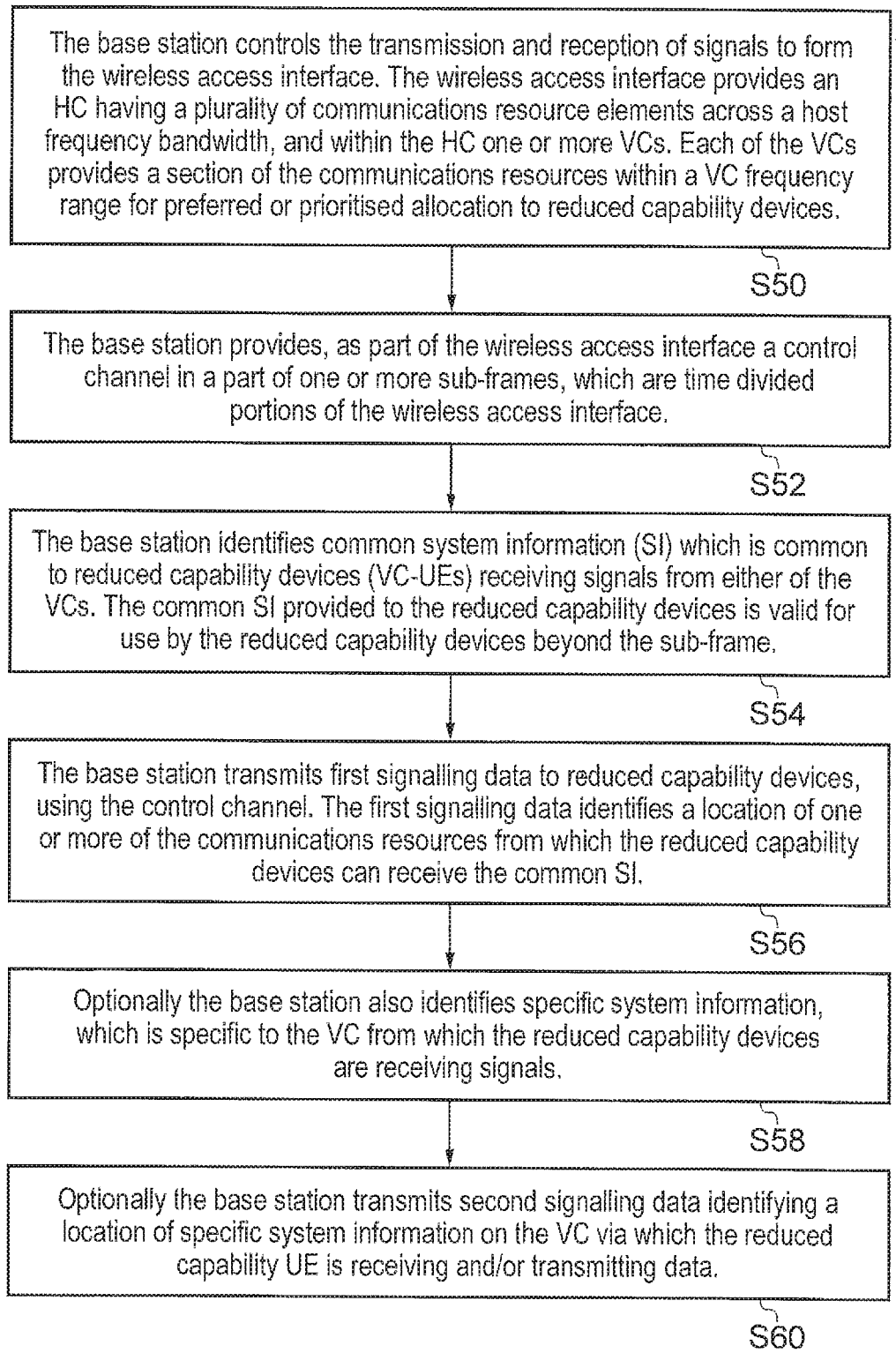
FIG. 14 is a flow diagram illustrating the operation of a mobile communications network according to the present technique.

The operation of a base station or eNB according to the present technique is illustrated in one example by the flow diagram in FIG. 14, which is summarised as follows:

S50: As explained with reference to the mobile communications system represented in the example embodiment of FIG. 13, a base station 1401 of a mobile communications network includes a transmitter unit 1409 configured to transmit signals to communications devices and a receiver unit 1409 configured to receive signals transmitted from communications devices and a controller 1411. The controller 1411 is configured to control the transmitter unit 1409 and the receiver unit 1409 to form a wireless access interface. The wireless access interface provides an HC having a plurality of communications REs across a host frequency bandwidth, and within the HC one or more VCs. Each of the VCs provides a section of the communications resources within a VC frequency range for allocation preferably to reduced capability devices.

S52: The base station provides, as part of the wireless access interface a control region, which is arranged to form a control channel using a subset of REs in a part of one or more sub-frames. The sub-frames are time divided portions of the wireless access interface.

S54: The base station identifies common system information (SI) which is common to reduced capability devices (VC-UEs) receiving signals from any of the one or more VCs, which are provided within the HC. The common SI provided to the reduced capability devices is valid for use by the reduced capability devices beyond the sub-frame in contrast to the signalling information allocating resources on the VC to the UEs, which is only valid within the sub-frame.

S56: The base station transmits first signalling data to reduced capability devices, using the control channel provided within the VC. The first signalling data identifies a location of one or more of the communications resources from which the reduced capability devices can receive the common SI. The communications resources on which the common SI is transmitted may be on one or more of the VCs or the HC, but are common to all the reduced capability devices being served by the base station 1401.

S58: Optionally the base station also identifies specific SI, which is specific to the VC from which the reduced capability devices are receiving signals from that VC.

S60: Optionally the base station transmits second signalling data identifying a location of specific SI on the VC via which the reduced capability UE is receiving and/or transmitting data.

Figure 15:
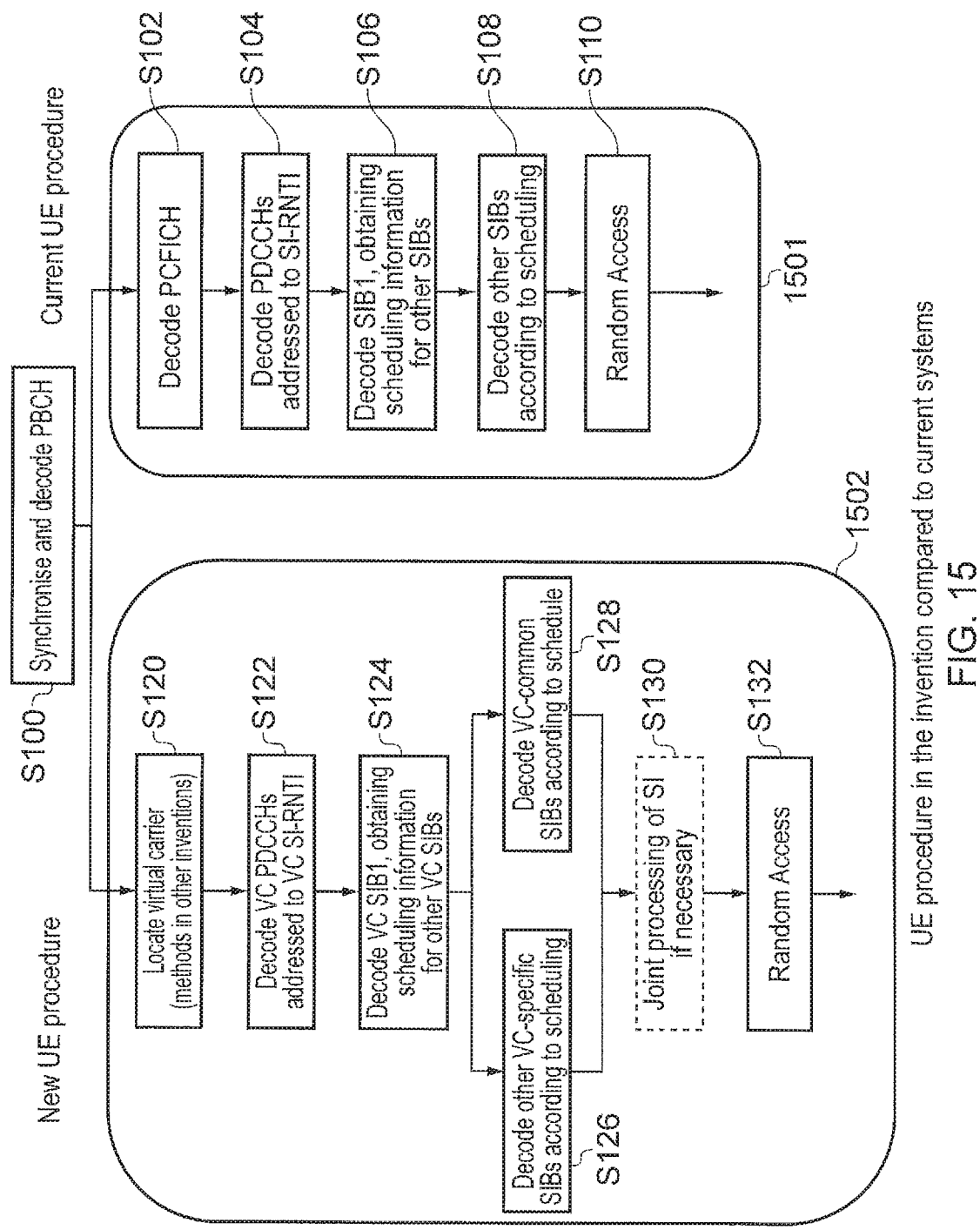
FIG. 15 is a flow diagram illustrating the operation of a communications device (UE) according to the present technique.

FIG. 15 provides an example flow diagram illustrating an example operation of a reduced capability device in accordance with the present technique. In FIG. 16 in a right hand side a process flow is shown for a conventional communications device whereas the left hand side 1502 illustrates process steps performed by a reduced capability device adapted in accordance with the present technique. The process operation for a conventional communications device shown in box 1501 on the right hand side will be summarised as follows:

S100: The conventional communications device first synchronises with the sub-frame and detects the PDCCH by decoding the PBCH.

S102: In a conventional operation, the communications device decodes the PCFICH and then in step S104 decodes the PDCCH's addressed to the communications device using the SI-RNTI as explained above.

S106: The communication device then decodes the SI, for example, SIB1 obtaining a scheduling information for other SI blocks (SIB's).

S108: The communications device then decodes other SIB's according to the scheduling information detected in step S106.

S110: The communications device can then perform a random access in order to request communications resources for transmission on the uplink or indeed receive communications resources for receiving information on the downlink.

The procedure performed by a reduced capability communications device according to the present technique as represented within box 1502 is summarised as follows:

S100: After synchronising with the sub-frame and decoding the PPCH the reduced capability device can then proceed to detect specific SI blocks and common system information blocks as explained as follows;

S120: The reduced capability device first locates a VC in accordance with the operation of a reduced capability device when operating on a VC within the HC.

S122: The reduced capability device then decodes signalling data from the VC control region such as a PDCCH which is addressed to the device using a VC SI-RNTI which corresponds substantially to the step performed in step S104.

S124: The reduced capability device then decodes the first SI block SIB1 obtaining scheduling information for other VC SIB's. The reduced capability device then operates in parallel in respect of the detection of specific VC-SI in step S126 and common SI in step S128.

S126: The reduced capability device follows the signalling information identifying the specific VC SIBs and receives the VC-SI from the SI blocks according to the scheduling received in step S124.

S128: Correspondingly the reduced capability device detects and recovers the VC common SI blocks using the scheduling information in step S124.

S130: In some examples the reduced capability device is arranged to receive both the VC specific SIB's and the VC common SIB's jointly if these are located within the same sub-frame and on the same frequency.

S132: The reduced capability device is then able to perform a random access to request communications resources on the uplink or receive messages allocating communications resources on the downlink for receiving data from the mobile communications network.

Various further aspects and features of the present disclosure are defined in the appended claims. Various combinations of the features of the dependent claims may be made with those of the independent claims other than the specific combinations recited for the claim dependency. Embodiments of the present disclosure have been defined largely in terms of reduced capability devices transmitting data via a VC inserted in a conventional LTE based HC. However, it will be understood that any suitable device can transmit and receive data using the described VCs for example devices which have the same capability as a conventional LTE type device or devices which have enhanced capabilities. In general, the resource allocation of any SI message can be transmitted in any suitable control region, for example PDCCH, VC-PDCCH, or their counterparts of EPDCCH. Although embodiments of the present disclosure have been described with reference to LTE, it will be appreciated that other embodiments find application with other wireless communication systems such as UMTS.

Annex 1: Group Specific Search Space

A group-based control channel functionality can be implemented as explained in our co-pending UK patent application GB1221729.5. This functionality indicates the location of a further control region, which, in turn, indicates to reduced capability devices the behaviour of a VC embedded within a HC. It should be noted that there may in general be more than one VC in operation at a time on an HC (depending on scheduling needs, network configuration, etc.)—as illustrated in FIG. 5. Thus there can be more than one grouped PDCCH in the control region containing information for the more than one VC. In certain embodiments, the GSS is identified by CRC scrambling with a new group C-RNTI (G-C-RNTI). One mechanism for assigning the new G-C-RNTI to a communications device is to have that identifier assigned by the network during the RA procedure.

Assignment of G-C-RNTIs could be done, for example, by adding an additional field to the Random Access Response (RAR) to convey the G-C-RNTI, which could be taken from among the reserved RNTI values specified in TS 36.321, or by making reservations among the existing C-RNTIs in specification, or by defining new RNTI values. This approach is not backwards compatible, since legacy communications devices would not be able to interpret the extended RAR this would produce. The conventional Radio Resource Control (RRC) signalling in the random access procedure is summarised in 3GPP TS 36.300. An RA preamble is sent from a communications device to a base station (i.e. an eNodeB). The communications device uses a RA preamble transmission to announce its presence in a cell and to allow the eNB to establish the time of flight of the signal from communications device to base station. The base station constructs a RAR addressed to the RA-RNTI given by the communications device. The RA-RNTI is determined by the time and frequency resources in which the communications device transmitted the RA preamble. The RAR also includes a temporary C-RNTI (a new identifier assigned to the communications device while it is in the cell), and an indication of which preamble was received. The structure of the RAR at the MAC layer is described in 3GPP TS 36.321.

PDCCHs in the GSS can use a group DCI (G-DCI). This G-DCI can adopt an existing DCI format, or use one or more new DCI format(s) which are restricted specifically to the GSS; the DCI format used being selected so that the number of blind decodes across DCI formats is limited. Irrespective of format, the G-DCI conveys information relevant to all Communications devices in the group. Particular examples for the VC include:

The location of a further control region within the resources of the VC.

The reference signal (RS) structure on the VC, since this may differ from that in existing specifications and the HC.

Carrier aggregation (CA) information specific to aggregated VCs.

The PDCCHs within the VC control region then provide communications device-specific information regarding the scheduling, etc. on the VC. Note that it is therefore possible that a communications device in possession of a G-C-RNTI need not search for a UESS on the HC control region (PDCCH), saving a potentially significant amount of blind decoding processing effort.

As noted above, the location (start point) of each communications device's UESS among the various CCEs can change per sub-frame to reduce the possibility of scheduling conflicts making it impossible to schedule all desired Communications devices for successive sub-frames. The CSS on the other hand is fixed in location to reduce the search load for Communications devices. Since there could be more than one group-based PDCCH, at least one per VC, the same location (start point) nature for the GSS could be appropriate as for the UESS, i.e. that location should ideally change on a per sub-frame basis. The location (start point) of the GSS could be determined based on the G-C-RNTI assigned to the group, in a similar manner to the start point of searching UESS being defined by the conventional C-RNTI assigned to a communications device.

Further example embodiments of the present disclosure can provide communications device for transmitting data to or receiving data from a mobile communications network. The mobile communications network includes one or more network elements, the one or more network elements providing a wireless access interface for the communications device. The communications device comprises a transmitter unit adapted to transmit signals representing the data to the mobile communications network via the wireless access interface provided by the one or more network elements of the mobile communications network, and a receiver unit adapted to receive signals representing the data from the mobile communications network via the wireless access interface provided by the one or more network elements of the mobile communications network. The wireless access interface provides a plurality of communications resource elements across a host frequency range of a host carrier, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range. The receiver unit is configured with a reduced capability to receive the signals only within a frequency bandwidth which is less than the host frequency range and equal to at least one of the first frequency range and the second frequency range. The wireless access interface includes a plurality of time divided sub-frames, and at least one of the sub-frames includes a control channel in a part of the sub-frame for communicating first signalling data to reduced capability devices, the first signalling data identifying a location of one or more of the communications resources from which the communications device can receive common system information, the common system information providing information which is common to one or more other reduced capability devices, the common system information being valid for use by the communications device beyond the sub-frame, and the communications device includes a controller configured to control the receiver unit to receive the first signalling data from the control channel and the common system information from the one or more communications resources identified by the first signalling data.

In one example the control channel communicates the first signalling data identifying the location of the common system information is formed from communications resources of a control region of one of the first frequency range of the first virtual carrier or the second frequency range of the second virtual carrier, and the receiver may be configured to detect the first signalling data from within the control region of the first virtual carrier or the second virtual carrier. The location of the one or more of the communications resources from which the communications device can receive the common system information may be within at least one of the first frequency range of the first virtual carrier, the second frequency range of the second virtual carrier or the host frequency range of the host carrier outside the first and second frequency ranges, and the controller is configured in response to the first signalling data to control the receiver to receive the common system information from the one or more communications resources of one or more of the first, the second virtual carriers or the host carrier.

In another example the control channel for communicating the first signalling data may be formed within a first control region of the first virtual carrier within a first frequency range. The first control region provides one or more of the communications resources within the first frequency range within which the reduced capability devices can receive the first signalling data, and the first signalling data may identify the location of the common system information in one or more communications resources within the second frequency range of the second virtual carrier, and the controller may be configured in response to the first signalling data to control the receiver unit to detect the common system information from the one or more communications resources within the second virtual carrier.

The following numbered clauses provide further example aspects and features of the present technique:

1. An infrastructure equipment for forming part of a mobile communications network, the infrastructure equipment comprising:

a transmitter unit configured to transmit signals to communications devices via a wireless access interface, a receiver unit configured to receive signals transmitted from communications devices via the wireless access interface, and a controller configured to control the transmitter unit and the receiver unit to form the wireless access interface providing a plurality of communications resource elements across a host frequency bandwidth, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein the wireless access interface includes a plurality of time divided sub-frames, and at least one of the sub-frames includes a control channel in a part of the sub-frame, and the controller is configured in combination with the transmitter unit to transmit first signalling data to reduced capability devices, the reduced capability devices having a capability to receive the signals only within a frequency bandwidth which is less than the host frequency range and equal to at least one of the first frequency range and the second frequency range, and the first signalling data identifies a location of one or more of the communications resources from which the reduced capability devices can receive common system information, the common system information providing information which is common to the reduced capability devices receiving signals from the first virtual carrier and the second virtual carrier and is valid for use by the reduced capability devices beyond the sub-frame.

2. An infrastructure equipment according to clause 1, wherein the control channel for communicating the first signalling data identifying the location of the common system information is formed from the communications resources of a control region of one of the first frequency range of the first virtual carrier or the second frequency range of the second virtual carrier, and the controller is configured in combination with the transmitter unit to transmit the first signalling data from within the control region of the first virtual carrier or the second virtual carrier.

3. An infrastructure equipment according to clause 1 or 2, wherein the controller is configured in combination with the transmitter unit to transmit the first signalling data identifying the location of the one or more of the communications resources from which the reduced capability devices can receive the common system information within at least one of the first frequency range of the first virtual carrier, the second frequency range of the second virtual carrier or the host frequency range of the host carrier outside the first and second frequency ranges, and to transmit the common system information from the one or more communications resources of one or more of the first, the second virtual carriers or the host carrier.

4. An infrastructure equipment according to clause 1, wherein the controller is configured in combination with the transmitter unit to transmit the first signalling data in the control channel, the control channel being formed within a first control region of the first virtual carrier within the first frequency range, the first control region providing one or more of the communications resources within the first frequency range within which the reduced capability devices can receive the first signalling data, the first signalling data identifying the location of the common system information in one or more communications resources within the second frequency range of the second virtual carrier, and to transmit the common system information in the one or more communications resources within the second virtual carrier.

5. An infrastructure equipment according to clause 4, wherein the controller is configured in combination with the transmitter unit to arrange for the first frequency range of the first virtual carrier and the second frequency range of the second virtual carrier to be closely located within the host frequency range of the host carrier, and to transmit the common system information on communications resources which are included within the second frequency range of the second virtual carrier.

6. An infrastructure equipment according to any of clauses 1 to 5, wherein the control channel is formed within the first control region of the first virtual carrier, and the controller is configured to identify the common system information and specific system information, the specific system information being specific to the first virtual carrier, and in combination with the transmitter unit to transmit the first signalling data in the control channel, identifying the location of the common system information on the second virtual carrier and second signalling data identifying a location of the specific system information, which is specific to the reduced capability reduced capability devices, within the first frequency range of the first virtual carrier, and to transmit the specific system information in the first virtual carrier and the common system information in the second virtual carrier.

7. An infrastructure equipment according to clause 6, wherein the controller is configured in combination with the transmitter unit to arrange for the first frequency range of the first virtual carrier and the second frequency range of the second virtual carrier to be closely located within the host frequency range of the host carrier and to transmit the common system information on the communications resources which are included within the first frequency range of the first virtual carrier and the second frequency range of the second virtual carrier.

8. An infrastructure equipment according to clause 6, wherein the controller is configured in combination with the transmitter unit to transmit the common system information on the communications resources of the first virtual carrier, and the communications resources of the second virtual carrier and the communications resources of the second virtual carrier which are included within the communications resources transmitting the common system information are displaced in time with respect to the communications resources of the first virtual carrier which are transmitting the common system information, whereby the communications resources of the second virtual carrier which are used to transmit the common system information with the communications resources of the first virtual carrier are at a different time within the sub-frame than the communications resources of the second virtual carrier.

9. An infrastructure equipment according to clause 1, wherein the controller is configured in combination with the transmitter unit to transmit the first signalling data identifying the location of the common system information in the control channel, the control channel being formed within the communications resources of a host control region of the host carrier within the host frequency range, the first signalling data being transmitted on a subset of communications resources within the host control channel using a group identifier, whereby the reduced capability devices being a member of a group of reduced capability devices which has access to the group identifier can search for the first signalling data.

10. An infrastructure equipment according to any of clauses 1 to 9, wherein the common system information includes one or more of a representation of an early warning, an emergency indication, a cell re-selection indication, a frequency location of the first and second virtual carriers, information relating to splitting of system information for the first and second virtual carriers which is part common to the first virtual carrier and the second virtual carrier and part specific to the first virtual carrier or the second virtual carrier or intra-cell virtual carrier re-selection information.

11. An infrastructure equipment according to any of clauses 1 to 10, wherein the specific system information includes information specific to the reduced capability devices to receive the signals or to transmit the signals via one of the first or the second virtual carriers from which the specific system information was received.

12. A method of communicating with a communications device from an infrastructure equipment forming part of a mobile communications network, the method comprising:

transmitting signals representing data to communications devices via a wireless access interface, receiving signals representing data transmitted from communications devices via the wireless access interface, and controlling the transmitting and the receiving to form the wireless access interface providing a plurality of communications resource elements across a host frequency bandwidth, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein the wireless access interface includes a plurality of time divided sub-frames, and at least one of the sub-frames includes a control channel in a part of the sub-frame, and the controlling the transmitting comprises transmitting first signalling data to reduced capability devices, the reduced capability devices having a capability to receive the signals only within a frequency bandwidth which is less than the host frequency range and equal to at least one of the first frequency range and the second frequency range, and the first signalling data identifies a location of one or more of the communications resources from which the reduced capability devices can receive common system information, the common system information providing information which is common to the reduced capability devices and is valid for use by the reduced capability devices beyond the sub-frame.

13. A method according to clause 12, wherein the controlling the transmitting comprises forming the control channel for transmitting the first signalling data identifying the location of the common system information from the communications resources of a control region of one of the first frequency range of the first virtual carrier or the second frequency range of the second virtual carrier, and transmitting the first signalling data from within the control region of the first virtual carrier or the second virtual carrier.

14. A method according to clause 12 or 13, wherein the controlling the transmitting comprises transmitting the first signalling data identifying the location of the one or more of the communications resources from which the reduced capability devices can receive the common system information within at least one of the first frequency range of the first virtual carrier, the second frequency range of the second virtual carrier or the host frequency range of the host carrier outside the first and second frequency ranges, and transmitting the common system information from the one or more communications resources of one or more of the first, the second virtual carriers or the host carrier.

15. A method according to clause 12, wherein the controlling the transmitting comprises transmitting the first signalling data in the control channel, the control channel being formed within a first control region of the first virtual carrier within the first frequency range, the first control region providing one or more of the communications resources within the first frequency range within which the reduced capability devices can receive the first signalling data, the first signalling data identifying the location of the common system information in one or more communications resources within the second frequency range of the second virtual carrier, and transmitting the common system information in the one or more communications resources within the second virtual carrier.

16. A method according to clause 15, wherein the controlling the transmitting comprises arranging for the first frequency range of the first virtual carrier and the second frequency range of the second virtual carrier to be closely located within the host frequency range of the host carrier, and transmitting the common system information on communications resources which are included within the second frequency range of the second virtual carrier.

17. A method according to any of clauses 12 to 16, wherein the control channel is formed within the first control region of the first virtual carrier, and the method comprises identifying the common system information and specific system information which is specific to reduced capability devices receiving signals from the first virtual carrier, and the controlling the transmitting comprises transmitting the first signalling data in the control channel, identifying the location of the common system information on the second virtual carrier and transmitting second signalling data within the first frequency range of the first virtual carrier, identifying a location of the specific system information, the specific system information being specific to the first virtual carrier, and transmitting the specific system information in the first virtual carrier and the common system information in the second virtual carrier.

18. A method according to clause 17, wherein the controlling the transmitting comprises arranging for the first frequency range of the first virtual carrier and the second frequency range of the second virtual carrier to be closely located within the host frequency range of the host carrier and transmitting the common system information on communications resources which are included within the first frequency range of the first virtual carrier and the second frequency range of the second virtual carrier.

19. A method according to clause 17, wherein the controlling the transmitting comprises transmitting the common system information on the communications resources of the first virtual carrier and the communications resources of the second virtual carrier and the communications resources of the second virtual carrier which are included within the communications resources transmitting the common system information are displaced in time with respect to the communications resources of the first virtual carrier, which are transmitting the common system information, whereby the communications resources of the second virtual carrier which are used to transmit the common system information with the communications resources of the first virtual carrier are at a different time within the sub-frame than the communications resources of the second virtual carrier.

20. A method according to clause 12, wherein the controlling the transmitting comprises transmitting the first signalling data identifying the location of the common system information in the control channel, the control channel being formed within the communications resources of a host control region of the host carrier within the host frequency range, the first signalling data being transmitted on a subset of communications resources within the host control channel using a group identifier, whereby the reduced capability devices being a member of a group of reduced capability devices which has access to the group identifier can search for the first signalling data.

21. A method according to any of clauses 12 to 20, wherein the common system information includes one or more of a representation of an early warning, an emergency indication, a cell re-selection indication, a frequency location of the first and second virtual carriers, information relating to splitting of system information for the first and second virtual carriers which is part common to the first virtual carrier and the second virtual carrier and part specific to the first virtual carrier or the second virtual carrier or intra-cell virtual carrier re-selection information.

22. A method according to any of clauses 12 to 21, wherein the specific system information includes information specific to the reduced capability devices to receive the signals or to transmit the signals via one of the first or the second virtual carriers from which the specific system information was received.

23. A mobile communications network comprising one or more infrastructure equipment configured to form a wireless access interface for transmitting signals to or receiving signals from communications devices, the wireless access interface providing a plurality of communications resource elements across a host frequency bandwidth, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein the wireless access interface includes a plurality of time divided sub-frames, and at least one of the sub-frames includes a control channel in a part of the sub-frame, and the infrastructure equipment is configured transmit first signalling data to reduced capability devices, the reduced capability devices having a capability to receive the signals only within a frequency bandwidth which is less than the host frequency range and equal to at least one of the first frequency range and the second frequency range, and the first signalling data identifies a location of one or more of the communications resources from which the reduced capability devices can receive common system information, the common system information providing information which is common to the reduced capability devices and is valid for use by the reduced capability devices beyond the sub-frame.

24. A mobile communications network according to clause 23, wherein the control channel for communicating the first signalling data identifying the location of the common system information is formed from the communications resources of a control region of one of the first frequency range of the first virtual carrier or the second frequency range of the second virtual carrier, the infrastructure equipment is configured to transmit the first signalling data from within the control region of the first virtual carrier or the second virtual carrier.

25. A mobile communications network according to clause 22 or 23, wherein the infrastructure equipment is configured to transmit the first signalling data identifying the location of the one or more of the communications resources from which the reduced capability devices can receive the common system information within at least one of the first frequency range of the first virtual carrier, the second frequency range of the second virtual carrier or the host frequency range of the host carrier outside the first and second frequency ranges, and to transmit the common system information from the one or more communications resources of one or more of the first, the second virtual carriers or the host carrier.

REFERENCES

[1] US 2012/0063358
[2] PCT/GB2012/050213
[3] PCT/GB2012/050214
[4] PCT/GB2012/050223
[5] PCT/GB2012/051326
[6] GB1221729.5

What is claimed is:

1. An infrastructure equipment for forming part of a mobile communications network, the infrastructure equipment comprising:
  a transmitter configured to transmit signals to communications devices via a wireless access interface,
  a receiver configured to receive signals transmitted from communications devices via the wireless access interface, and circuitry configured to control the transmitter and the receiver to form the wireless access interface providing a plurality of communications resource elements across a host frequency range, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein
  the wireless access interface includes a plurality of time divided sub-frames,
  at least one of the sub-frames includes a control channel in a part of the sub-frame,
  the circuitry is configured in combination with the transmitter to transmit first signalling data on the first virtual carrier and the second virtual carrier to reduced capability devices, the reduced capability devices having a capability to receive the signals only within a frequency bandwidth which is less than the host frequency range and equal to at least one of the first frequency range and the second frequency range, and the first signalling data transmitted on the first virtual carrier and the second virtual carrier identifies a location of one or more of the communications resources from which the reduced capability devices can receive common system information, the common system information providing information which is common to the reduced capability devices receiving signals from the first virtual carrier and the second virtual carrier and is valid for use by the reduced capability devices beyond the sub-frame, and
  the control channel is used for communicating the first signalling data identifying the location of the common system information and is formed from the communications resources of a control region of the first frequency range of the first virtual carrier and the second frequency range of the second virtual carrier, and the circuitry is configured in combination with the transmitter to transmit the first signalling data from within the control region of the first virtual carrier and the second virtual carrier.

2. The infrastructure equipment as claimed in claim 1, wherein the circuitry is configured in combination with the transmitter to transmit the common system information from one or more communications resources of one or more of the first virtual carrier, the second virtual carrier or a host carrier formed outside of the first and second frequency ranges.

3. The infrastructure equipment as claimed in claim 1, wherein the first signalling data identifies the location of the common system information in one or more communications resources within the second frequency range of the second virtual carrier.

4. The infrastructure equipment as claimed in claim 3, wherein the circuitry is configured in combination with the transmitter to arrange for the first frequency range of the first virtual carrier and the second frequency range of the second virtual carrier to be contiguous within the host frequency range of the host carrier, and to transmit the common system information on communications resources which are included within the second frequency range of the second virtual carrier.

5. The infrastructure equipment as claimed in claim 1, wherein the circuitry is configured to identify the common system information and specific system information, the specific system information being specific to the first virtual carrier, and in combination with the transmitter to transmit the first signalling data in the control channel, identifying the location of the common system information on the second virtual carrier and second signalling data identifying a location of the specific system information, which is specific to the reduced capability reduced capability devices, within the first frequency range of the first virtual carrier, and to transmit the specific system information in the first virtual carrier and the common system information in the second virtual carrier.

6. The infrastructure equipment as claimed in claim 5, wherein the circuitry is configured in combination with the transmitter to arrange for the first frequency range of the first virtual carrier and the second frequency range of the second virtual carrier to be contiguous within the host frequency range and to transmit the common system information on the communications resources which are included within the first frequency range of the first virtual carrier and the second frequency range of the second virtual carrier.

7. The infrastructure equipment as claimed in claim 5, wherein the communications resources of the second virtual carrier which are included within the communications resources transmitting the common system information are displaced in time with respect to the communications resources of the first virtual carrier which are transmitting the common system information.

8. The infrastructure equipment as claimed in claim 1, wherein the common system information includes one or more of a representation of an early warning, an emergency indication, a cell re-selection indication, a frequency location of the first and second virtual carriers, information relating to splitting of system information for the first and second virtual carriers which is part common to the first virtual carrier and the second virtual carrier and part specific to the first virtual carrier or the second virtual carrier or intra-cell virtual carrier re-selection information.

9. The infrastructure equipment as claimed in claim 5, wherein the specific system information includes information specific to the reduced capability devices to receive the signals or to transmit the signals via one of the first or the second virtual carriers from which the specific system information was received.

10. A method of communicating with a communications device from an infrastructure equipment forming part of a mobile communications network, the method comprising:
  transmitting signals representing data to communications devices via a wireless access interface,
  receiving signals representing data transmitted from communications devices via the wireless access interface, and
  controlling the transmitting and the receiving to form the wireless access interface providing a plurality of communications resource elements across a host frequency bandwidth, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein the wireless access interface includes
a plurality of time divided sub-frames, and at least one of the sub-frames includes
a control channel in a part of the sub-frame, and
the controlling the transmitting comprises
  transmitting first signalling data on the first virtual carrier and the second virtual carrier to reduced capability devices, the reduced capability devices having a capability to receive the signals only within a frequency bandwidth which is less than the host frequency range and equal to at least one of the first frequency range and the second frequency range, and the first signalling data transmitted on the first virtual carrier and the second virtual carrier identifies a location of one or more of the communications resources from which the reduced capability devices can receive common system information, the common system information providing information which is common to the reduced capability devices and is valid for use by the reduced capability devices beyond the sub-frame; and
forming the control channel for transmitting the first signalling data identifying the location of the common system information from the communications resources of a control region of the first frequency range of the first virtual carrier and the second frequency range of the second virtual carrier, and transmitting the first signalling data from within the control region of the first virtual carrier and the second virtual carrier.

11. The method as claimed in claim 10, further comprising:
  transmitting the common system information from one or more communications resources of the first virtual carrier, the second virtual carrier, or a host carrier formed outside of the first and second frequency ranges.

12. The method as claimed in claim 10, wherein the first signalling data identifies the location of the common system information in one or more communications resources within the second frequency range of the second virtual carrier.

13. The method as claimed in claim 12, wherein the controlling the transmitting comprises arranging for the first frequency range of the first virtual carrier and the second frequency range of the second virtual carrier to be contiguous within the host frequency range of the host carrier, and transmitting the common system information on communications resources which are included within the second frequency range of the second virtual carrier.

14. The method as claimed in claim 10, wherein the method comprises:
identifying the common system information and specific system information which is specific to reduced capability devices receiving signals from the first virtual carrier, and the controlling the transmitting comprises transmitting the first signalling data in the control channel, identifying the location of the common system information on the second virtual carrier and transmitting second signalling data within the first frequency range of the first virtual carrier, identifying a location of the specific system information, the specific system information being specific to the first virtual carrier, and transmitting the specific system information in the first virtual carrier and the common system information in the second virtual carrier.

15. The method as claimed in claim 14, wherein the controlling the transmitting comprises arranging for the first frequency range of the first virtual carrier and the second frequency range of the second virtual carrier to be contiguous within the host frequency range of the host carrier and transmitting the common system information on communications resources which are included within the first frequency range of the first virtual carrier and the second frequency range of the second virtual carrier.

16. The method as claimed in claim 14, wherein the communications resources of the second virtual carrier which are included within the communications resources transmitting the common system information are displaced in time with respect to the communications resources of the first virtual carrier, which are transmitting the common system information.

17. An infrastructure equipment for forming part of a mobile communications network, the infrastructure equipment comprising:
circuitry configured to:
transmit signals to communications devices via a wireless access interface;
receive signals transmitted from communications devices via the wireless access interface; and
form the wireless access interface providing a plurality of communications resource elements across a host frequency bandwidth, and providing a first section of the communications resources within a first frequency range for preferable allocation to reduced capability devices forming a first virtual carrier and a second section of the communications resources within a second frequency range for preferable allocation to the reduced capability devices forming a second virtual carrier, each of the first frequency range and the second frequency range being within the host frequency range, wherein
the wireless access interface includes a plurality of time divided sub frames,
at least one of the sub-frames includes a control channel in a part of the sub frame, and
the circuitry is further configured to transmit first signalling data on the first virtual carrier and the second virtual carrier to reduced capability devices, the reduced capability devices having a capability to receive the signals only within a frequency bandwidth which is less than the host frequency range and equal to at least one of the first frequency range and the second frequency range, and the first signalling data identifies a location of one or more of the communications resources from which the reduced capability devices can receive common system information, the common system information providing information which is common to the reduced capability devices receiving signals from the first virtual carrier and the second virtual carrier and is valid for use by the reduced capability devices beyond the sub-frame, wherein
the control channel is used for communicating the first signalling data identifying the location of the common system information and is formed from the communications resources of a control region of the first frequency range of the first virtual carrier and the second frequency range of the second virtual carrier, and the circuitry is configured in combination with the transmitter to transmit the first signalling data from within the control region of the first virtual carrier and the second virtual carrier.

* * * * *